(12) United States Patent
Ow et al.

(10) Patent No.: US 11,159,306 B2
(45) Date of Patent: Oct. 26, 2021

(54) AUTONOMOUS EXCHANGE VIA ENTRUSTED LEDGER TOKEN AND TRANSACTION MANAGEMENT

(71) Applicant: Duvon Corporation, Las Vegas, NV (US)

(72) Inventors: Benedict Ow, Las Vegas, NV (US); Richard Stiles, Las Vegas, NV (US); Anthony Tan, Las Vegas, NV (US)

(73) Assignee: Duvon Corporation, Las Vegas, NV (US)

(*) Notice: Subject to any disclaimer, the term of this patent is extended or adjusted under 35 U.S.C. 154(b) by 286 days.

(21) Appl. No.: 16/035,658

(22) Filed: Jul. 15, 2018

(65) Prior Publication Data

US 2019/0327082 A1  Oct. 24, 2019

Related U.S. Application Data

(63) Continuation-in-part of application No. 15/961,521, filed on Apr. 24, 2018, now Pat. No. 10,855,446.

(51) Int. Cl.
| | |
|---|---|
| *H04L 9/06* | (2006.01) |
| *H04L 9/32* | (2006.01) |
| *H04L 29/06* | (2006.01) |
| *G06N 5/02* | (2006.01) |
| *G06Q 20/16* | (2012.01) |
| *G06Q 20/36* | (2012.01) |

(52) U.S. Cl.
CPC .......... *H04L 9/0637* (2013.01); *G06N 5/022* (2013.01); *G06Q 20/3674* (2013.01); *H04L 9/3213* (2013.01); *H04L 63/1416* (2013.01)

(58) Field of Classification Search
CPC . H04L 9/0637; H04L 9/3213; H04L 63/1416; G06N 5/022; G06C 20/3674
See application file for complete search history.

(56) References Cited

U.S. PATENT DOCUMENTS

| | | | |
|---|---|---|---|
| 10,355,869 B2* | 7/2019 | Bisti | H04L 9/3247 |
| 10,423,938 B1* | 9/2019 | Gaeta | G06Q 20/4016 |
| 2015/0081566 A1* | 3/2015 | Slepinin | G06Q 20/3678 705/69 |
| 2017/0034197 A1* | 2/2017 | Daniel | H04L 9/3236 |
| 2017/0132630 A1* | 5/2017 | Castinado | G06Q 20/382 |
| 2018/0068130 A1* | 3/2018 | Chan | G06F 21/64 |
| 2018/0165476 A1* | 6/2018 | Carey | G06F 21/577 |
| 2018/0198617 A1* | 7/2018 | Drouin | G06T 19/006 |
| 2018/0300382 A1* | 10/2018 | Madisetti | G06Q 20/0658 |
| 2019/0080402 A1* | 3/2019 | Molinari | G06Q 40/06 |
| 2019/0080407 A1* | 3/2019 | Molinari | G06Q 20/223 |
| 2019/0130391 A1* | 5/2019 | Wright | G06Q 20/3678 |

(Continued)

*Primary Examiner* — Darshan I Dhruv
(74) *Attorney, Agent, or Firm* — Lightbulb IP, LLC

(57) ABSTRACT

An Autonomous Exchange via Entrusted Ledger (AXEL) blockchain is discussed herein. The AXEL blockchain enables users to perform transactions in a private setting while enabling the transaction records thereof to be verified by other network users without publicly divulging the contents or details of the transaction records. The token identification system and method allows the tokens to carry an immutable identification to prevent negative blockchain occurrences such as double spending. A payment methodology allowing integration of external financial institutions with user owned and managed wallet.

11 Claims, 11 Drawing Sheets

(56) References Cited

U.S. PATENT DOCUMENTS

| | | | |
|---|---|---|---|
| 2019/0132138 A1* | 5/2019 | Finlow-Bates | H04L 9/3236 |
| 2019/0149550 A1* | 5/2019 | Brakeville | G06F 21/62 |
| | | | 726/5 |
| 2019/0165930 A1* | 5/2019 | Castinado | H04L 9/3239 |
| 2019/0180276 A1* | 6/2019 | Lee | H04L 63/10 |
| 2019/0188704 A1* | 6/2019 | Grendon | G06Q 20/3674 |
| 2019/0205881 A1* | 7/2019 | Borzilleri | G06Q 20/389 |
| 2019/0238525 A1* | 8/2019 | Padmanabhan | H04L 63/0428 |
| 2019/0287107 A1* | 9/2019 | Gaur | G06Q 20/407 |
| 2019/0303942 A1* | 10/2019 | Balaraman | G06Q 20/4016 |
| 2020/0167820 A1* | 5/2020 | Sun | G06Q 30/0267 |

* cited by examiner

AUTONOMOUS EXCHANGE VIA ENTRUSTED LEDGER TOKEN AND TRANSACTION MANAGEMENT

CROSS-REFERENCE TO RELATED APPLICATION

This application is a continuation-in-part of U.S. patent application Ser. No. 15/961,521, filed Apr. 24, 2018.

BACKGROUND OF THE INVENTION

1. Field of the Invention

This invention relates to blockchain architecture that provides both public and private chains (ledger mechanisms) to enable transactional tracking and reporting in a publicly visible environment, while enabling privacy protection to ensure a level of privacy of transaction records.

2. Related Art

Blockchain or distributed ledger technology provides a decentralized architecture for validation of records. Traditionally, the blockchain or distributed ledger and the information therein is shared across participating network nodes.

From the discussion that follows, it will become apparent that the present invention addresses the deficiencies associated with the prior art while providing additional advantages and benefits not contemplated or possible with prior art constructions.

SUMMARY OF THE INVENTION

An Autonomous eXchange via Entrusted Ledger blockchain (hereinafter "AXEL") is described herein. AXEL is a distributed blockchain network that utilizes a suite of unique smart contracts to facilitate the transfer, storage, sharing, and streaming of digital content through the network enabling trust to be established between nodes while providing private transaction capabilities for participants within the AXEL blockchain. While the following disclosure provides an example of the AXEL blockchain in a decentralized network configuration, the AXEL blockchain can easily be configured to support centralized architectures in both public, private, and hybrid deployment configurations.

AXEL is intended to provide a networking environment wherein transactions that occur between parties can be done in a private setting while still enabling the network trust element of a publicly available ledger. AXEL utilizes a unique public and private chain (ledger) approach to decentralized computing wherein the details of transactions that occur between parties remain hidden from public view. In one preferred embodiment, a file can be transferred between a first and a second user. The transaction record of the file transfer will appear in detail on the private ledger of both the first and the second user. Witnesses to this transaction can execute the consensus algorithm to ensure that the transaction has occurred and has been verified, but the user hosting a node that is a witness will not know or have visibility to the details of the actual transaction. This enables the first and second user to maintain the privacy of their transaction while still enabling the blockchain to witness and verify the transaction to ensure authentication and accuracy.

AXEL provides participants with the capability of managing digital content in a blockchain environment. In this example, the storage, transfer, sharing, and streaming capabilities are controlled directly by the user and not through a centralized control mechanism.

The AXEL blockchain may include a utility token mechanism that enables users to create a commerce capability wherein they may trade access or download rights to digital content they own and manage within AXEL in exchange for utility tokens.

In one embodiment, the AXEL blockchain enables a user of a computing device (e.g. personal computer, smartphone, tablet, etc.) to access and manage any digital content located on the subject device (either from that same device or through another device) and provide access to the content through the AXEL blockchain. This embodiment may, in one advantageous configuration, work in conjunction with the PINApp (Pervasive Intermediate Network Attached Storage Application) platform, which is described in U.S. Pat. No. 9,792,452 to enable access and management of digital content.

As one example of the use of AXEL, an AXEL user such as a healthcare provider may wish to transfer patient records privately and securely through AXEL to a health insurance provider. The healthcare provider may select the patient records they wish to transfer and initiate the exchange to the insurance provider. The insurance provider would receive the subject patient records and acknowledge receipt through AXEL.

The transaction in the scenario above is witnessed by a randomly selected group of nodes running a witness consensus algorithm against the subject transaction. Using a consensus algorithm, witnesses reach a consensus and resolve the transaction. As the consensus is completed, the healthcare providers' private blockchain (ledger) will be updated with a block showing the transaction that occurred with the insurance provider. In a similar fashion, the insurance providers' private blockchain (ledger) would also be updated with a block that mirrored the block created for the healthcare provider. These mirror blocks would appear on the subject blockchains (ledgers) of each party participating in a transaction. The witness parties' private blockchains (ledgers) would also contain a mirror block reflecting the transaction that they witnessed.

At the conclusion of the subject transaction in the example above, each participating party (healthcare provider, insurance provider, and witnesses) would automatically update their private blockchains (ledgers) to their alpha blocks associated with each user. The updates to the alpha blocks would contain a verification that the transaction was witnessed and that it was successfully authenticated and verified, validating the subject transaction. In the interest of privacy, the updates to the alpha blocks associated with the transaction would not contain any details of the transaction that took place that are visible to users outside of the immediate transaction other than that the transaction was witnessed, authenticated, and verified.

The details of the transaction in the above sequence will be available and visible only to the parties that were directly involved in the transaction (in this example, the healthcare provider and insurance provider). Since the transaction is of a private nature, the transaction details will not be made available to parties outside of the immediate transaction.

The devices used by the witness pool executing the consensus algorithm against the transaction will have access to the details of the subject transaction during the consensus process, but these details will not be visible to the user(s) whose devices are executing the consensus algorithm. These details will be hidden from view to maintain the privacy of the transaction. Once the transaction is completed and digitally signed by the witness pool, each witness will have a mirror block of the subject transaction added to their private ledger (chain). The mirror blocks created for the witnesses will contain, but will not enable visibility to, the details of the subject transaction. The mirror blocks are a key component of the AXEL blockchain as they provide a safeguard against parties who may try to alter or otherwise compromise the conditions or details of a transaction. By making the transaction details invisible to users outside of the immediate transaction, the AXEL network can protect the integrity of the transactions that occur within the AXEL blockchain while still providing an accurate account of the transaction verification on the public blockchain.

In order to assist with providing adequate storage to facilitate a desirable environment for transactions, the AXEL blockchain can include a distributed network storage capability that allows nodes participating in AXEL to sell storage space that is attached to their local area network devices. In one preferred embodiment, a user may create a node with a personal or home computing device such as a personal computer. The user may attach a one terabyte external storage drive to that personal computer and make the space on that storage drive available for use by other participants within the network.

Unlike existing distributed and decentralized storage methods, in a preferred embodiment, AXEL stores the key codes for both encryption and decryption of the content destined for the network storage on their gateway device such as a personal computer. This ensures the privacy and security of the content being stored as the keys required to access and execute the stored content resides with the user who owns the content.

AXEL can also utilize a redundant storage algorithm that distributes the encrypted parts of the digital content being stored and places them on multiple (participating) devices throughout the AXEL blockchain. In this embodiment, AXEL may routinely request ID and storage information from the network to ensure that the content being stored is both available and accessible to the user. Should a node go offline rendering the stored content unavailable, AXEL may notify the gateway device that the content is no longer available and create additional backup copies of the content that is no longer available. These copies could be gathered from other repositories within the network storing identical encrypted fragments of the subject digital content throughout the AXEL blockchain.

AXEL can also incorporate mechanisms to comply with identification and anti-corruption due diligence requirements, such as regulations directed at money laundering activities. For example, to comply with current regulations AXEL may include an "anti-money laundering" (AML) and "know your customer" (KYC) mechanism to ensure positive identity of the participants on the AXEL blockchain. At account creation, users will disclose information about themselves during the sign up process, as well as information about the devices they are utilizing to connect to the AXEL blockchain.

If PINApp is used with AXEL, device information can be collected through the PINApp and stored in the users' private chain. Information about the device such as the MAC code will be kept in the users' private ledger (chain) to ensure that if someone were to steal their login and access information, they would be unable to access the AXEL network because the device they are utilizing is not registered to the network. In a like fashion, a person using a registered device may not access the AXEL network without the proper login and authentication information.

The AXEL blockchain can utilize functional components of the PINApp, and it may also include functional components of the Digital Certification Analyzer ("DCA")—as set forth in U.S. Pat. Nos. 9,419,965; 9,565,184; and 9,723,090—to prevent unauthorized access of digital content. For example, the PINApp could be utilized to perform device unification capabilities allowing AXEL participants to access the AXEL blockchain from remote devices such as smartphones, tablets, and the like. The DCA functional components could be utilized in support of the AML/KYC implementation as well as the multi-factor authentication mechanisms.

In addition to the AML/KYC mechanism disclosed previously, the AXEL blockchain can also incorporate a self-sovereign identity capability that gives users complete control of their identity as well as the capability to privately store and secure the identity content, including any third-party verification and authorization validating the identity. This self-sovereign identity may be deleted, in whole or in part, by the user/owner of the identity in compliance with emerging privacy laws.

The devices, features, and functions described herein are intended to disclose a method to provide readily scalable blockchain architecture that supports the transfer of digital content and other assets, while enabling privacy and security mechanisms to protect the privacy of users, while also providing accuracy of ledger reporting to ensure trust and accountability within the blockchain. Unlike existing blockchain networks, the Autonomous eXchange via Entrusted Ledger (AXEL) network will utilize a unique ledger capability that separates out the public ledger (or public chain) from the private ledger (or private chain) allowing users to conduct transactions privately while still enabling the ledger to be authenticated by a consensus-type algorithm to ensure accuracy and blockchain integrity.

The AXEL blockchain described herein addresses the need for an efficient, scalable, and cost-effective method to allow users to manage transactions relating to digital content and other digital assets through a decentralized network wherein participants can establish a level of trust through the use of a public ledger that will track and record the transactions made within the network. The AXEL blockchain can include a utility-type token mechanism to enable parties to conduct transactions within the network and exchange the tokens in lieu of traditional currencies such as USD and the like.

The AXEL blockchain creates an environment wherein transactions made between one or more parties can be done privately without the need to notify each node in the network that a transaction has occurred, but to additionally enable the ledger to maintain accuracy and track the transactions without divulging the specific details of the transactions that occurred.

The AXEL blockchain additionally can enable the transfer, storage, sharing, and streaming of digital content (e.g. files, folders, movies, songs, etc.) to be presented and available for transactions through the AXEL blockchain. To perform this functionality, the AXEL blockchain may incorporate functional components of the PINApp.

Functionally, PINApp unifies the storage repositories across all users' computing devices and makes the content available to multiple devices as it if were hosted locally in a single repository. By enabling PINApp capability with the AXEL blockchain, users can participate in the storing, sharing, streaming, and transfer of digital content and other digital assets without the requirement to physically upload and/or move any of their content to a specific storage or device in order to allow blockchain access and engagement with the digital content.

In one preferred embodiment, a user of the AXEL blockchain will execute the blockchain gateway on a home computer but be able to access and engage the transactional capabilities of the AXEL blockchain from any of their portable devices. This capability allows a user to participate in the network from anywhere, negating the need for them to operate the blockchain gateway on each of their devices in order to gain access to the network.

In one preferred embodiment, a first user may wish to sell a digital asset such as a photo that is hosted on a portable device such as a smartphone. The first user may execute the sale transaction directly from the smartphone and engage the AXEL blockchain remotely, negating the need for the first user to physically move or copy the photo to the device running the blockchain gateway.

As the transaction above is executed, a second user (buyer) would execute a purchase through the AXEL blockchain utilizing the utility token and acquire the photo directly from the first user's smartphone hosting the referenced content. This would also negate the need to copy or otherwise move the content to a public cloud or other holding repository to allow the second user (buyer) to gain access.

The transactions occurring (as in the above example) within the AXEL blockchain are recorded to a ledger, enabling the AXEL blockchain to accurately track transactions that occur. Unlike traditional ledger technologies, the AXEL blockchain will utilize a unique ledger methodology that incorporates a public and private component of the ledger.

The public ledger (or chain) will be created in support of the network's need to provide visibility and tracking of the transactions that occur within the blockchain. The private ledger (or chain) will be created on a per-user basis, allowing each user to conduct transactions within the AXEL blockchain and enjoy a level of privacy for their associated transactions. While specific examples are provided herein of specific information that is included on the public ledger or the private ledger, AXEL may be specifically configured to adjust the particular information that is included on the public or private ledger. For example, depending on what types of transactions are contemplated or changes in laws, it may be advantageous or necessary to include more information on the private ledger as compared to the public ledger or vice versa. As another example, it may prove necessary for more information to be included on the public ledger to promote certainty in transaction verification or to better ensure that the system cannot be compromised. Thus, the disclosure herein should not be read as limiting and is only an example of the types of information that may be included on the public and private ledgers.

Each participant within the AXEL blockchain will be assigned an alpha-type block within the public ledger (chain) and a private ledger (chain).

In a preferred embodiment, the private ledger will report to the public ledger alpha block associated with the user. Any transactions that occur within the AXEL blockchain will be recorded immediately to the private ledger of the parties associated with the subject transaction. As the transactions are completed and the private ledger is updated, the updated information is reported from the private ledger to the public ledger alpha block.

The separation of the public chain and the private chain exists to (a) allow the user to enjoy a level of privacy while engaging in their transactions; (b) keep an accurate and ongoing record of each transaction the user is involved in; (c) enable the user to participate in the witness mechanism (described in detail later in this submission) and; (d) to enable the artificial intelligence mechanism (described in detail later in this submission) within the AXEL blockchain to parse the transactional data on behalf of the user and provide guidance and recommendations as to how the user can get more benefit from their participation within the AXEL blockchain.

As transactions are recorded to the AXEL blockchain, the consensus algorithm will incorporate a witness mechanism that is described in detail later in this submission. In one preferred embodiment, the witness mechanism will select a group of nodes (5 to 20 nodes as an example) using a randomized algorithm. The selected group of nodes will perform the consensus calculation against a transaction. Once consensus has been reached by the selected witness group (nodes), the transaction will be digitally signed by the witness(es) and the private ledger (chain) will be updated with a new block (or blocks) reflecting the transaction being recorded. Non-private information pertaining to the subject transaction such as (but not limited to) the authentication of the transaction and the witness nodes participating in the transaction will be visible on the public ledger (chain) in association with the alpha block hosting the private chain where the transaction took place. The incorporation of the witness mechanism allows multiple transactions to occur and be confirmed through the consensus algorithm process simultaneously, speeding up the network transaction capability.

The AXEL blockchain will also provide a user-focused artificial intelligence (AI) component that will collect and parse transactional data on behalf of the user to give them instant access to information that was transacted utilizing the AXEL blockchain. Transactional information such as automobile maintenance schedules, medical history records, prescription drug records, and other lifestyle events can be processed and tracked through the AI functions of the AXEL blockchain.

In one preferred embodiment, the AXEL blockchain AI component will collect and parse information pertaining to the history of a specific user to enable the user to instantly access information including but not limited to medical records, prescription medication history, car maintenance history, general sale and purchase history and other lifestyle metrics that can be managed and tracked through the private ledger and parsed with the artificial intelligence module. The information will be provided to the user based on a query submitted by the user pertaining to their transactional history within the AXEL blockchain.

The purpose of the AI and the data parsing is to further enable the users of the AXEL blockchain to accurately track transactional history and provide feedback and historical information directly to the users of the AXEL blockchain. The AXEL blockchain AI component will act as a personal assistant or personal transaction manager for the user to enable them to easily recall historical information pertaining to transactions within the AXEL blockchain. In a preferred embodiment, the AI component is not intended or designated for use by any company or other entity seeking to collect user information for marketing or other purposes. The information may be stored and parsed at a local level to ensure the security and privacy of the AI functionality.

As previously stated, the user private chain will be updated as each transaction is executed and subsequently verified within the system utilizing a consensus algorithm.

In a similar fashion, the user private chain will be updated with a block reflecting the user participation in the witness mechanism. Blocks created on the user (witness) private chain during the nodes' participation in a witness function/event are designated as mirror blocks. These blocks mirror the transaction that the subject node witnessed to ensure the accuracy of the consensus and to prevent attempts to alter the transaction or the associated blocks hosted within the ledger(s).

The mirror-blocks are include details of the transaction that took place during the transaction being witnessed, along with the consensus verification to ensure the block has been verified and/or vetted through the consensus algorithm within the AXEL blockchain. The purpose of the mirror-block is to prevent a party (user) from making a change or augmenting a transaction that has already occurred and been verified within the AXEL blockchain. The witness mechanism and the mirror-block function are described in detail later in this submission.

In one preferred embodiment, the witness mechanism will select a group of nodes (5 to 20 nodes as an example) from the AXEL blockchain using a randomized algorithm. The selected group of nodes will perform the consensus calculation against a transaction. Once consensus has been reached by the selected witness group (nodes), the witness (es) will digitally sign the transaction and the ledger (chain) will be updated with a new block (or blocks) reflecting the transaction being recorded. Each node (witness) participating in the consensus of the subject transaction will create a mirror-block on their own private chain to reflect the transaction in which they participated. The incorporation of the witness-consensus feature allows multiple transactions to occur and be confirmed simultaneously, speeding up the network transaction resolution capability.

In a preferred embodiment, the witness mirror blocks created on the witness private chain during a witness event contain encrypted information which prevents the user of the witness node from seeing any private or personal details from the subject transaction. Details such as party names, items being bought or sold, the pricing of the subject items, vendor names, and other private details of the transaction are encrypted to protect the privacy of the parties that participated in the subject transaction. However, in order for the witness function to perform properly, this information is shared (in an encrypted format) with each witness performing the consensus algorithm via the witness function. Once the witness event is complete (regardless of whether the transaction was authorized or declined) the blocks added to the witness ledger will be encrypted to protect the privacy of the participants of the subject transaction.

In another preferred embodiment, nodes participating as witnesses in a transaction will create mirror-blocks which are then added to their respective private ledger (chain) to serve as an indication that the transaction has occurred and been verified through the witness mechanism, that they (the participating node) executed the consensus algorithm of the subject transaction, and to ensure that changes may not be made to a ledger entry that has already been verified within the AXEL blockchain.

In this preferred embodiment, mirror-blocks become a component of each user's private ledger (chain) that participates in a witness event. Since the users of the network do not know when a node will be selected as a witness to a transaction, they cannot accurately predict or target these nodes for purposes such as hacking or introducing non-verified ledger information into the AXEL blockchain. The randomized algorithm that selects the nodes to participate in the witness event prevents any visibility of the transaction details to participating nodes, ensuring accuracy and security of the transactions and ledger updates.

In a preferred embodiment, the AXEL blockchain provides a distributed storage capability to enable participants of the network to store the digital content (e.g. files, folders, images, etc.) on participating computing devices connected to the AXEL blockchain. Unlike typical storage models, the AXEL blockchain stores the encryption and decryption information to support the distributed network storage function directly on the user's (content owner) private chain. This prevents visibility to the user encryption data, and subsequently the files and digital content being stored within the network. By locally storing the encryption and decryption information on the user's local private chain, the AXEL blockchain ensures availability of the keys utilized to manage the stored content.

The AXEL blockchain will routinely query the participating storage repositories to ensure the content being stored within the AXEL blockchain continues to remain in the location in which it was stored. Due to the distributed and decentralized nature of the storage repositories that will be connected to the AXEL blockchain, continuous verification of file storage accessibility, integrity, and availability is paramount to ensuring the security of the stored content.

In a preferred embodiment, the digital content stored within the AXEL blockchain will be stored redundantly, ensuring the availability of stored content in cases wherein the device storing the subject content becomes unavailable due to being offline or for other unforeseen circumstances. In one preferred embodiment, a file may be locally fragmented and encrypted on the user device utilizing the distributed decentralized storage capability to store the file within the AXEL blockchain. The subject file fragments will then be sent to participating network storage nodes that will store the encrypted fragments. The participating nodes will host various fragments of the file to ensure redundancy, availability, and accessibility to the file owner within the AXEL blockchain. In one preferred embodiment, the same encrypted fragment portion of a file may be stored in a variety of locations within the AXEL blockchain to ensure redundancy and availability of the subject file. The location of the fragments and the contents therein will be known by no one within the AXEL blockchain except the file owner.

The AXEL blockchain will incorporate a unique user identification block that will contain information required to provide a positive identification of the user and their associated engagement with the AXEL blockchain. The user identification block will be created on the private chain component of the AXEL blockchain and remain in control of the user who owns the physical identification being written digitally to the identification block.

Unlike identifications created by third-parties such as online shopping websites, eCommerce websites and the like, the user identification block will be created by and controlled by the user/owner of the identification. The user/owner may then allow (at their sole discretion) a party to authenticate the identity of the user/owner to facilitate both digital and physical transactions that may occur and/or be recorded through the AXEL blockchain.

In one preferred embodiment, a user may create an identification block that provides a positive identity of the user and meets all legal requirements as such. In this embodiment, the identity will be under the complete control of the user/owner of the identity and may be deleted at any time, completely removing the user/owner identity from the AXEL blockchain. The user/owner of the identification will hold privacy-type keys that control the access to the identity and the usage thereof. A public key may be provided to a third party by the user identification owner to enable that third party to execute a one-time authentication of the identification of the user to enable eCommerce and other transactions of both physical and digital nature(s) that can be managed through the AXEL blockchain.

The user identity will be stored in a digital vault that is managed solely by the user identity owner. This vault (similar to a digital wallet) will be controlled by keys that the user/owner of the identification can share at their discretion to enable others to positively identify the user/owner for the purpose of transactions requiring such identification. The vault will exist on the user/owner controlled device(s) and may be backed-up to ensure integrity of the identity. As third-parties are allowed to verify the identity of the user/owner, these verification authorizations and confirmations will also be stored in the user identity vault to further add to the validity and authenticity of the user/owner identity.

The user identity block created on the private chain will support a self-sovereign control mechanism ensuring the user identity block can be both completely separated from the AXEL blockchain as well as to be deleted in its entirety. While the deletion of the user identity block will support legal requirements relating to "right to be forgotten" and other identity protection laws, the deletion of the user identity block will not negatively affect the authenticity of the transactions that occurred while the user was a participant in the AXEL blockchain. The user identity block may not be removed by anyone but the user/owner of the user identity block.

AXEL provides an integrated financial management system (hereinafter AXEL Pay) that enables a participant to utilize external financial institutions such as banks, currency exchanges, token markets and exchanges, and other institutions that engage in the management of personal finance to allow the user wallet to convert currency from a registered fiat currency within a region (such as USD) to the required token, digital currency, or cryptocurrency and then back again.

The purpose of the AXEL Pay system is to allow a user to participate in the AXEL network without having to take the manual step of physically exchanging their registered geographic fiat currency (such as USD) at a registered token or cryptocurrency exchange to enable the user to participate in the network utilizing a cryptocurrency, digital currency, or token instead of their geographically registered fiat currency. Currently, blockchain networks do not allow a user to utilize (as a currency) any payment mechanism that originates outside the blockchain network. Blockchain requires that the user utilize the token or cryptocurrency represented by the associated blockchain as a form of network-based currency. The AXEL Pay system will allow any user to exchange their fiat currency with a registered cryptocurrency without any intervention by the user.

AXEL Pay will automatically make the conversion required to support the blockchain network for the user whenever a user chooses to participate in a transaction that requires a financial exchange. As an example, if a user wishes to purchase a song from a seller on the AXEL blockchain, the user can simply activate their wallet to create a payment. The AXEL Pay system will then connect with the user's registered banking and/or cryptocurrency exchange agency and facilitate the transaction automatically in the appropriate token or cryptocurrency. Naturally this example assumes the user has the adequate registered currency funds (as an example in USD) to complete the transaction.

The AXEL blockchain will incorporate a token identification system and method (Token ID) that will enable the AXEL blockchain to track and account for all tokens created and utilized within the system. Unlike current blockchain mechanisms, the AXEL blockchain will be able to account for each unique Token ID within the network to ensure compliance with laws and regulations such as anti-money laundering and prevention of activity with sanctioned countries.

The Token ID will monitor and record the token location, movements, and authorized holder information to protect the user(s) against hazards such as hacks and wallet thefts. Should a wallet be stolen or otherwise rendered inaccessible to the wallet owner, the AXEL blockchain can immediately disallow the usage of the specified Token IDs to ensure that they are negated until such a time as they can be returned to the legal token owner.

Other systems, methods, features and advantages of AXEL will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating certain embodiments of the invention. The drawings are intended to illustrate particular configurations of the AXEL blockchain, but it should be understood that AXEL allows for variation of these configurations. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent to one skilled in the art that the present invention may be practiced without these specific details. In other instances, well-known features have not been described in detail so as not to obscure the invention.

As previously stated, AXEL is comprised of two distinct and separate blockchains: a public blockchain that is provided to enable public visibility to transactional history and a private blockchain to allow users within the AXEL blockchain to conduct their transactions privately between consenting parties. Each user within the AXEL network will be assigned both a publicly visible alpha-type block that resides on the public chain, and a private chain in which their personal transactions may be conducted to insure privacy and discretion.

The purpose of the AXEL blockchain's two-chain approach is to allow users to conduct their daily transactions in a more private setting, while at the same time enabling the consensus and verification of the transactions to be shared through a publicly visible ledger represented by the public blockchain.

For the purpose of the discussions that follow a node is a computer or other computing-type terminal that is running at least a portion of the AXEL gateway client software. Nodes communicate with each other through the AXEL gateway client software and create a decentralized distributed network to operate the AXEL blockchain. Storage of the public and private blockchains discussed herein may be facilitated through localized storage at the node location, localized storage at the user location (in reference to private chains). Additionally, storage of the reference chain elements can be managed through the AXEL distributed decentralized network storage capability or any combination thereof.

Figure 1:
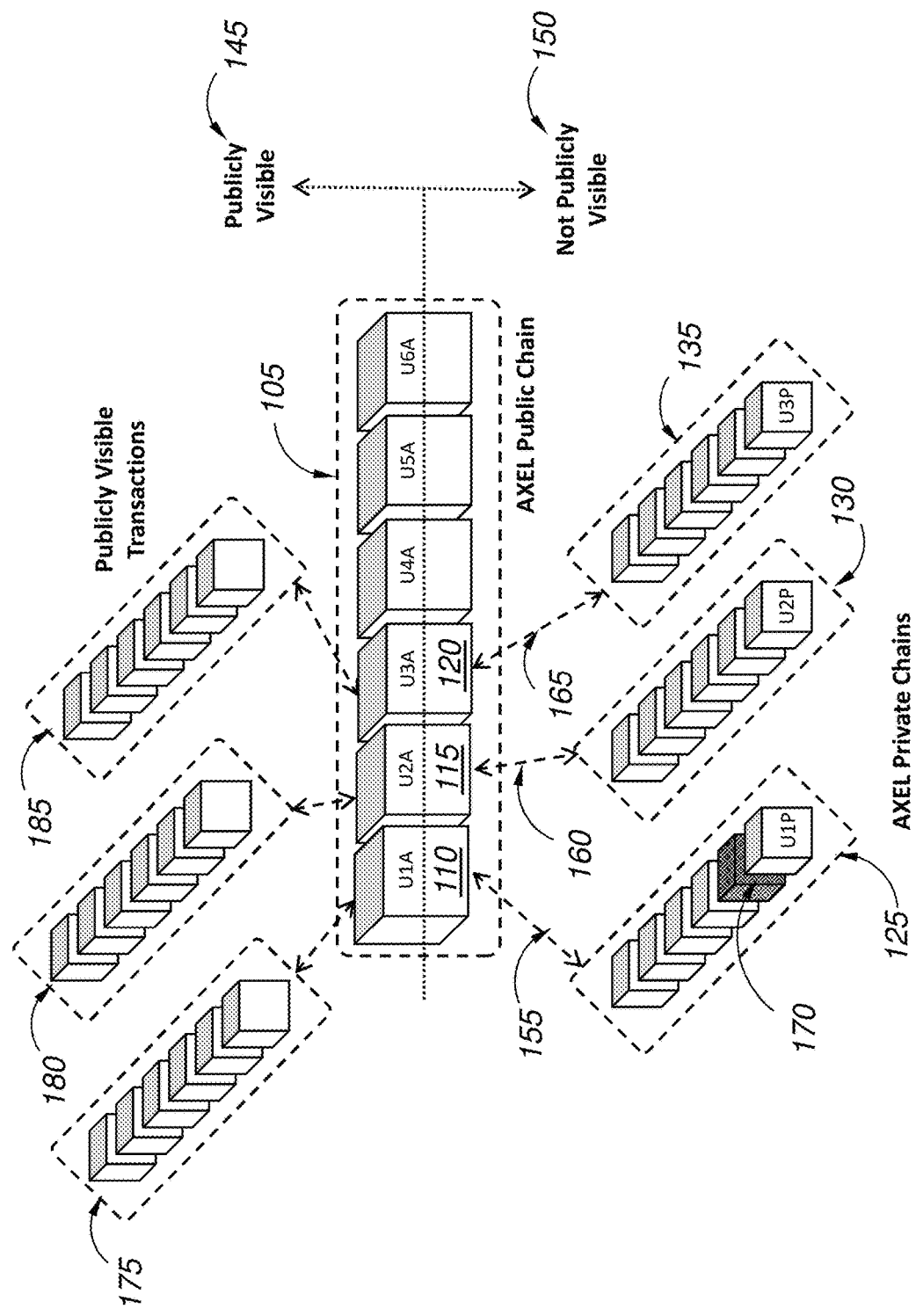
FIG. 1 is a diagram illustrating the public and private chain elements of AXEL.

A general description of the chain mechanisms will now be described with reference to FIG. 1. As can be seen in FIG. 1, the AXEL public chain 105 is comprised of blocks (110, 115, 120, etc.) designated as alpha blocks (U1A=User 1 alpha block, U2A=User 2 alpha block, etc.). These alpha blocks are created to represent each participant/user that creates an account and participates in the AXEL blockchain. The alpha block (described in detail in the pages that follow) is designated to store the historical data for the user in which the alpha block is designated and represents the publicly visible aspects of the user profile. As can be seen in FIG. 1 the AXEL public chain 105 is comprised of user alpha blocks (U1A, U2A, etc.). The user 1 alpha block 110 is designated as the publicly visible profile for user 1 and is paired 155 with a private chain 125. In a similar fashion, the user 2 alpha block 115 is paired 160 with a private chain 130. User 3 alpha block 120 is also paired 165 with a private chain 135. Each alpha block (110, 115, and 120) is designated and assigned to its respective user private chain (125, 130, and 135 respectively).

The pairing indicators (155, 160, and 165 respectively) represented in FIG. 1 are intended to show both the relationship of the respective alpha blocks (110, 115, and 120) with their private chain counterparts (125, 130, and 135) but also to demonstrate a direct communication link associated with each alpha block (110, 115, and 120) to their respective private chains (125, 130, and 135).

The communications 155, 160, and 165 provide direct engagement for each of the private chains 125, 130, and 135 with their respective alpha blocks 110, 115, and 120 to ensure the public visibility of the vetted transactions as well as enabling the transfer and logging of transactional information between the alpha blocks (110, 115, and 120) and their respective private chains (125, 130, and 135).

As previously stated, the AXEL public chain 105 represents the publicly visible 145 aspects of the AXEL blockchain whereas the private chains 125, 130, and 135 represent the components of the AXEL blockchain that are not visible to the public 150. The purpose of the AXEL public chain 105 and the respective private chains 125, 130, and 135 is to enable the users to enjoy a level of privacy while engaging in transactions with other users while still giving the AXEL public chain 105 and the subsequent nodes (not pictured) visibility to the fact that each transaction that occurs on the private chains (125, 130, and 135) has been verified by the AXEL blockchain.

As an example of the chain utilization, user 1 (private chain 125) engages in a transaction. Once the transaction has been resolved utilizing the consensus algorithm (witness mechanism discussed later in this submission), a new block 170 is added to the private chain 125. As the private chain 125 has been augmented with the new block 170, the private chain 125 communicates 155 the addition of the new block 170 to the user 1 alpha block 110 hosted on the AXEL public chain 105. This process repeats itself each time a user executes a transaction within the AXEL blockchain.

The details of the above subject transaction 170 will be invisible 150 to other users on the AXEL blockchain with the exception of other user(s) participating in the subject transaction. This gives the users of the AXEL blockchain the capability to conduct their transactions with a level of privacy.

It is important to note that while the transactions occur in a private setting within the AXEL blockchain, in the preferred embodiment, they do not occur with anonymity. As previously stated, the advantages of this are that verification and authentication of identity is beneficial in some instances to comply with certain regulations including, for example Anti-Money Laundering and Know Your Customer regulations. While this information would not be publicly available to other participants in the network, they will know that when they conduct transactions with other users, that these users have been authenticated and vetted by AXEL.

With continued reference to FIG. 1, as the transaction 170 is updated 155 to user 1's associated alpha block 110 the transaction verification becomes publicly visible 145, but the details of the actual transaction itself do not. As an example (and with continued reference to FIG. 1), user 1 (not shown) executes a transaction. The transaction involved a purchase made from an online retailer (not pictured). The details of that purchase including (but not limited to) the item purchased/sold, the item price, any applicable discounts, buyer/seller name and contact info, any warranty information, etc. will be visible on user 1's private chain 125 as represented by the newly created block 170. As block 170 is shared 155 to user 1's respective alpha block 110 it will be stored in the user's transaction history (explained in detail later in this submission). As the user 1 alpha block 110 is updated, the AXEL public chain 105 will enable the nodes (not pictured) to see that the user 1 alpha block 110 has been updated and verified by the AXEL blockchain, but they will not know the details of the transaction. They will however be able to see that the transaction added to the user 1 alpha block 110 has been vetted and verified by the AXEL blockchain.

Again, in the interest of being able to create a private transaction, the details of the transaction will only be visible to the users directly involved with the subject transaction (in this example the buyer and seller). The remainder of the blockchain users (nodes) will see that a transaction has occurred and has been verified by the system (to ensure validity and transparency pertaining to the transaction history) but will not be able to see the details of the actual transaction.

In a similar fashion if a person were to walk into a pharmacy and make a purchase from the pharmacist, other parties present in the pharmacy would have visibility to the person making a transaction with the pharmacist, but would not be privy to the details of the subject transaction. While the AXEL blockchain is capable of supporting transactions of a completely anonymous nature, in a preferred embodiment users are provided a measure of privacy to conduct transactions within an environment wherein the ledger components can enable a measure of trust to exist between nodes over a distributed and decentralized network.

As stated previously, the alpha blocks are created and hosted within the public chain to represent each user within the AXEL network. Each alpha block acts as a repository and control mechanism for each user and their associated private chain.

Figure 2:
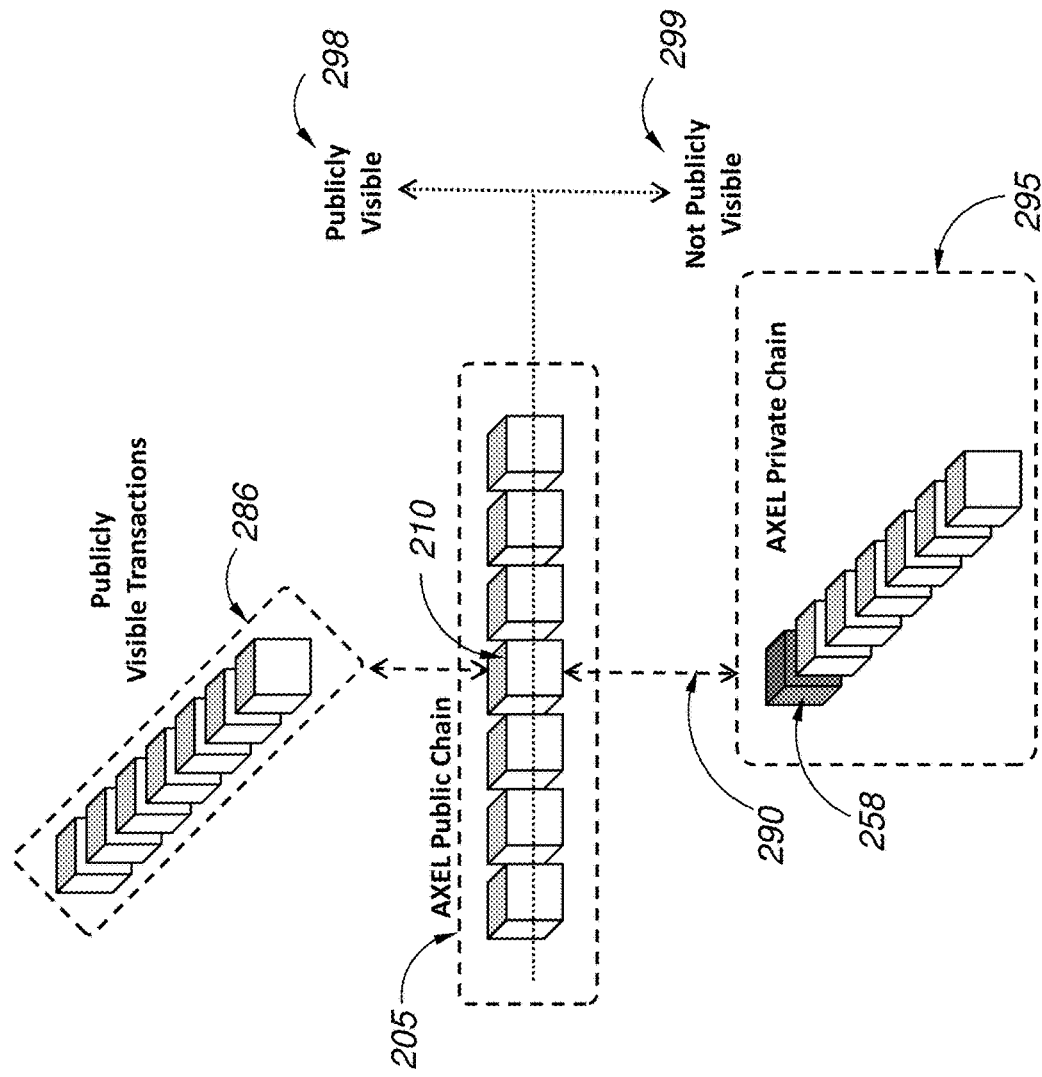
FIG. 2 is diagram illustrating the functional aspects of the AXEL blockchain.

In the discussion that follows, functionality that exists on both the public chain and the private chain of the AXEL blockchain will be disclosed. In many cases, like or similar functional elements will be present on both the public chain and private chain components of the AXEL blockchain. FIG. 2 has been simplified to ease understanding of the functionality and to limit redundancy within the descriptions. It will be apparent to one skilled in the art that these functional elements can coexist or be implemented (or not implemented) separately as required by the specific implementation of the AXEL blockchain. The functional elements with reference to FIG. 2 are discussed in the following paragraphs.

As can be seen in FIG. 2, the public and private chains of the AXEL blockchain share a number of common functional elements 201. These functional elements 201 are AXEL communications 215, AXEL A.I. 220, user reputation 225, private chain history 230, chain communications 235, witness administration 240, wallet and token administration 245, AXEL database 250, user ID info 255, network addressing 260, unified device ID info 265, chain recovery 270, communications and support 275, storage/CPU/mining 280, and the AXEL DCA—security 285 function. Each of these functions within the AXEL blockchain has a presence and designated functional implementation on both the AXEL public chain 205 and the AXEL private chain 295. Each of these functional elements will be described in detail in the pages that follow.

As can be seen in FIG. 2, the AXEL public chain 205 is comprised of alpha blocks 210. Each of these alpha blocks 210 represents a user/participant within the AXEL blockchain. Each alpha block 210 is directly affiliated 290 and in direct communications with a private chain 295 that is utilized to record transactional and use history for each user participating within the AXEL blockchain. It is important to note that the AXEL blockchain can support a virtually unlimited number of users and/or participants. The public chain 205 and private chain 295 references provided show a single user configuration to ease understanding of the figure and to allow for focus on the functional aspects and engagement between the public 205 and private 295 chains respectively.

With continued reference to FIG. 2, the AXEL communications 215 function resides on both the alpha block 210 and within the private chain 295. The AXEL communications 215 function provides a mechanism wherein users within the AXEL blockchain can conduct communications between parties. Functions such as an instant message, text or SMS-type message, email messages, and other communications elements are supported by the AXEL communications 215 function. In one embodiment the AXEL blockchain may be utilized as an electronic marketplace wherein participants may buy and sell goods. A first user may engage the AXEL communications 215 function to leave a message within the marketplace for a second user, or to comment on a product or service the second user may provide. In a similar fashion, the first and second user can engage the AXEL communications 215 function to engage in a private chat or private email type session within the blockchain. The AXEL communications 215 function manages communications between parties utilizing the AXEL blockchain.

The AXEL communications 215 function may utilize the DCA (Digital Certification Analyzer) to enable a first user to send a private message to a second user, and require the second user to initiate the DCA protocol to access the message. The message may also be protected and/or encrypted utilizing the AXEL DCA—Security 285 capability discussed later in this submission.

Communications within the AXEL blockchain can originate from either the public chain 205 or the private chain 295, depending on the nature of the communications and the needs of the user. As an example, a public message such as a posting to comment on a product purchased from an eCommerce site or other social-type publicly visible message may originate from the alpha block 210 on the AXEL public chain 205. A private message intended for a specific recipient or group of recipients may originate from the private chain 295.

The AXEL communications 215 function works in conjunction with the AXEL database 250, the network addressing 260, and the AXEL DCA—Security 285 functions to ensure proper configuration and delivery of various message types within the AXEL blockchain.

The AXEL A.I. (artificial intelligence) 220 function is integrated into the AXEL blockchain to support both public chain 205 and private chain 295 capabilities. On the private chain 295 the AXEL A.I 220 function is controlled and managed directly by the user.

Unlike traditional machine learning and artificial intelligence algorithms, the AXEL A.I. 220 function focuses on the private chain 295 to collect and parse information pertaining to the user and their respective transaction history to enhance the user's engagement and experience within the AXEL blockchain.

In one preferred embodiment, the AXEL A.I. 220 function may collect and parse information pertaining to a video stream viewing history that has been created by the user through their viewing transactions within the AXEL blockchain. The user may query the AXEL A.I. 220 function to obtain the subject history of their stream viewing engagement; along with recommendations for other potential streams the user may be interested in viewing.

The AXEL A.I. 220 function on the private chain 295 is provided and engaged at the sole discretion of the user. The information collected and parsed is stored in the alpha block 210 for recall at the request of the user. The AXEL A.I. 220 information stored in the alpha block 210 is not publicly visible or searchable through the public blockchain 205. Only the user (not pictured) can access the AXEL A.I. 220 capabilities and the subsequently generated information provided.

On the public chain 205 portion of the AXEL blockchain, the AXEL A.I. 220 function is utilized to promote self-healing within the network. The AXEL A.I. 220 function will collect and parse performance and transaction history from nodes to determine areas of the network that are underperforming or working at a less-than-optimal pace. This information can be collected by the AXEL nodes to aid in isolating problems within the blockchain and creating solutions to ensure the functionality of the AXEL blockchain remains at an optimal level. The AXEL A.I. 220 function on the public chain 205 works in conjunction with the user reputation 225 function discussed below.

The AXEL A.I. 220 function will also utilize a weighting-type algorithm to determine and engage the quickest transactional pathing between nodes participating in the AXEL blockchain. As an example, a transaction may occur within the network that involves multiple nodes for the purpose of transporting the information through the blockchain. The AXEL A.I. 220 function will parse information pertaining to node performance and node reputation to quickly and accurately plot the most direct route for the transportation of information through the blockchain. As more transactions occur, the AXEL A.I. 220 function will continue to monitor, collect, and parse the relevant information on the public chain 205 to ensure self-healing and efficient routing/pathing of transactions and data transportation.

With continued reference to FIG. 2, the user reputation 225 function gives the AXEL blockchain visibility to positive and negative elements associated with a node and/or a user within the AXEL blockchain.

Reputation information may be collected by the AXEL blockchain relating directly to the functionality of the node or gateway being managed by the user. As stated above, the AXEL A.I. 220 function will collect, parse, and report performance information of the associated network nodes.

In one embodiment, the user node (not pictured) may have introduced incorrect or otherwise non-validated chain data to the AXEL blockchain. The AXEL blockchain would recognize this invalid data through the consensus algorithm (discussed in detail later in this submission) and record the action as a negative for the participating node introducing the invalid data. As the reputation of a user or node moves in a negative direction, the AXEL blockchain may limit or decline participation in one or all activities within the AXEL blockchain. Node and user reputation is paramount to ensuring the security and privacy of the data being exchanged and the users within the AXEL blockchain engaging in these transactions.

If a user or node reputation continues to move in a negative direction, the AXEL blockchain (through the communications and support 275 function discussed later in this submission) will notify the user and/or node to correct the problem. As the user/node performs transactions properly, their reputation may recover. As previously stated, users and/or nodes that continue to receive a negative reputation will be subsequently limited or precluded entirely from activities within the AXEL blockchain.

As with other functional elements within the AXEL blockchain, the user reputation 225 function has both a public chain 205 presence through the alpha block 210, and a private chain 295 presence. Reputation may be granted in either a positive or negative fashion by the AXEL blockchain as discussed above, but may also be granted in either a positive or negative fashion by a second user or other participant within the AXEL blockchain. As an example, a user may participate in a transaction (through a marketplace element or a file share or transfer) that does not satisfy or meet the criteria of the transaction in a satisfactory manner for the user. The dissatisfied user may grant a negative reputation to the second participant in the transaction to show their displeasure with the subject transaction. The user may also post a public comment (to a marketplace as an example) where the original transaction took place. As previously stated, when a reputation moves too far in a negative direction the AXEL blockchain may limit or deny the user with a negative reputation from participating in some or all transactional acts until such a time as their reputation has been restored.

The private chain history 230 function serves multiple purposes within the AXEL blockchain. The primary function of the private chain history 230 function is to collect and store transactional information associated with the private chain 295 to ensure that a backup copy exists to support the restoration of the private chain 295 in the case of a failure of a user gateway device that resulted in loss or damage to the private chain 295.

As transactions occur within the private chain 295, the history is collected locally through the private chain history 230 function and reported to the public chain 205 for storage in the users' associated alpha block 210. The private chain history 230 function works in conjunction with the AXEL database 250 function to report and store details of the transactions undertaken by the user.

A second function of the private chain history 230 function is working in conjunction with the AXEL A.I. 220 function to enable a user to parse their history and enable AXEL to provide recommendations for future transactions as described in the examples given previously in this submission. Since the alpha block 210 will always be a component of the network and may not be deleted or removed by any means, the private chain history 230 function, along with other functional 201 elements will be available for recall in case of catastrophic failure on a client device or within the AXEL blockchain.

The AXEL blockchain defines a transaction as any event that creates a block of information that is added to the blockchain. In one embodiment of the AXEL blockchain, a participant may make a purchase utilizing a marketplace being hosted within the AXEL blockchain. This purchase (after being vetted by the consensus algorithm discussed in detail later in this submission) will create a block and add it to the users' private chain 295. The transaction (block) will be shared 290 with the associated users' alpha block 210 within the public blockchain 205.

The detailed information collected and stored within the private chain history 230 function is not publicly visible. Only the consensus information is publicly visible. This will ensure that the AXEL blockchain recognizes that all transactions have been authenticated within the blockchain, even though the details of the transactions are not visible. This ensures a level of privacy for the users within the AXEL blockchain while also ensuring the validity of each transaction that occurs.

The AXEL chain communications 235 function (illustrated by reference 290 in FIG. 2) controls the messaging and data access/movement between the alpha block 210 and the private chain 295. As an example, the user private chain history 230 function is updated to the alpha block 210 utilizing the AXEL chain communications 235 function and represented by the connection 290 shown between the private chain 295 and the alpha block 210 within the public chain 205.

The chain communications 235 function occurs constantly within the AXEL blockchain to ensure the information and transactions completed on the private chain 295 are being continuously communicated 290 to the public chain 205 and the subject corresponding alpha block 210.

The AXEL blockchain incorporates a witness mechanism (discussed in detail later in this submission) that randomly selects a group of five or more network users (or nodes) and utilizes these users to perform the consensus algorithm required to approve a transaction and add a block to the respective private chains of the transaction participants.

The witness administration 240 function governs and manages the aspects associated with creating and managing a witness pool to perform the consensus algorithm. As an example, a user may be selected randomly to perform the consensus algorithm to aid in the resolution of a pending transaction (referred to as the witness mechanism). As the user concludes their consensus session, the resulting verification and the fact that they participated in the subject consensus session will be noted by the witness administration 240 function.

The witness administration 240 function collects and stores (within the AXEL database 250 function) information related to the consensus algorithm function that includes, but is not limited to, the number of times a user and/or node participates as a witness, the number of times the consensus algorithm was executed resulting in a completed consensus, the number of times the consensus algorithm was executed and failed to achieve consensus, and the reputation of the user and/or node as a witness. As explained previously, the user reputation 225 function within the blockchain is vital to ensuring trust and node functionality. The user and/or node reputation relating to the witness administration 240 functions will be stored in both the witness administration 240 and the user reputation 225 functions.

As an example of the above, a user may be randomly selected as a witness by the witness administration 240 function within the AXEL blockchain. Should the consensus be reached successfully and match the consensus of the other participating witnesses, each witness may receive a positive user reputation for reaching a consensus. In a similar fashion, a node that fails to reach the consensus and/or acts in a negative manner pertaining to the network and other nodes may receive a negative user reputation. As previously stated, user reputation is required to remain a participant in good standing within the AXEL blockchain.

The wallet and token administration 245 function controls and manages actions related to both the token(s) that exist within the AXEL blockchain and the wallet mechanism the user and/or node engage to store their token(s). The wallet and token administration 245 function will manage both internal and external wallets that are engaged within the AXEL blockchain. As an example, a user may wish to utilize solely the wallet functionality (not pictured) that exists within the AXEL blockchain. The user may choose to incorporate a second wallet from a third party developer that is used to both store and manage tokens as well as used to purchase and transfer tokens between parties on the AXEL blockchain. The wallet and token administration 245 function will manage each of these wallets according to the configurations set by the user.

As with functions 201 related to the public 205 and private 295 chains within the AXEL blockchain, the wallet and token administration 245 function works in conjunction with other elements including (but not limited to) the AXEL database 250, the chain communications 235, the user ID info 255, the AXEL DCA—Security 285, the unified device ID info 265, the Storage/CPU/Mining 280 functions and others. As previously stated transactional information is stored within the alpha block 210 within the public chain 205.

The AXEL database 250 function engages with other functional 201 elements of the AXEL blockchain to ensure proper routing, tracking, addressing, and historical information is easily available for managing the transactional aspects of the AXEL blockchain. As an example, the AXEL database 250 function may contain routing information associated with user devices (not shown) connected to the AXEL blockchain via the user's personal computer (not shown). The subject routing information makes it possible for the user to access any digital content (e.g. file, folder, etc.) that is managed through or otherwise connected to the AXEL blockchain.

The AXEL database 250 function may also work in conjunction with modules such as the private chain history 230 function to ensure that private chain 295 recovery is possible in case of a catastrophic failure of a client device or other system causing damage to, or deletion of, the user private chain 295.

The AXEL database 250 function stores AXEL A.I. 220 function information relating to the self-healing aspects of the public chain 205 as discussed earlier in this submission. Weighted routing and pathing information may be stored in the AXEL database 250 function to ensure proper routing of traffic and other transactional aspects that occur between nodes within the AXEL blockchain.

The user ID info 255 function is designated to manage the user engagement with the AXEL blockchain. If configured to work in conjunction with the AXEL DCA—Security 285 function (discussed later in this submission), AXEL can utilize protocol from the Digital Certification Analyzer (U.S. Pat. Nos. 9,419,965; 9,565,184; and 9,723,090) to verify and authenticate the user(s) participating in the AXEL blockchain. The user ID info 255 function collects and manages the user identification, password, pin code, and other pertinent information relating to a user's account. The user ID info 255 function (as stated above) works in conjunction with the AXEL DCA—Security 285 function along with the AXEL database 250 function to store and authenticate user access information.

The user ID info 255 function also works with the unified device ID info 265 function discussed later in this submission to ensure that the login attempts are originating from devices and user(s) that have been verified within the system. As an example, a user may try to log into an AXEL account utilizing a registered device but an incorrect user ID and/or password. The login attempt would subsequently fail. As with the above, a user trying to log into the AXEL account from a non-registered device utilizing an authentic username and password would also fail. The AXEL blockchain requires that both authenticated devices and user accounts are verified through the AXEL DCA—Security 285 function working in conjunction with the AXEL database 250 and the user ID info 255 functions to enable access to a user account within the AXEL blockchain.

The user self-sovereign ID (SSID) 257 controls the detailed identification content of the user such as passport numbers and authentication, driver's license numbers, birth certificates, and other digitally managed identification assets that can be used to positively identify the user. The SSID 257 control creates a block on the private chain 258 that can be utilized by the user/owner of the private blockchain to enable third parties such as vendors, healthcare providers, and others to authenticate the identification of the user.

The SSID 257 will be controlled by a private and public key mechanism that enables the user/owner of the SSID 257 to share a public one-time-use key to any party as a means of accessing the SSID block 258 to confirm the identity of the user. As the authentication of the identification is provided to the third party, that authentication may be captured and stored in an identity vault (not pictured) that is privately stored and backed-up on a user-owned device such as a smartphone, computer, or other digital storage mechanism that can access the AXEL blockchain.

In compliance with emerging privacy laws, future changes thereto, or to adjust to shifting views on data privacy, in some embodiments, an option will exist such that the SSID block 258 can be deleted in whole or in part by the user. It may be desirable that a deletion of a user's SSID block 258 will cause the private chain 295 to immediately back-up some or all transaction content to the alpha block 210 on the public chain 205 and effectively close the account of the user, preventing further engagement with the AXEL blockchain. However, as it is contemplated that the user SSID 257 is utilized solely in instances wherein a transaction requires an extended authentication and validation of the user credentials, the SSID block 258 must remain active in order for the user to participate in such transactions. The AXEL blockchain may be configured such that no user may participate without an SSID block 258, or that a user without an SSID block 258 may have limited functionality. Common transactions such as certain types of file transfers, including content that is part of the public domain, or a purchase from an online eCommerce site may not require such authorization, and it is contemplated that the blockchain could be configured to allow a user without a complete SSID block 258 to participate in such transactions. Transactions of a significant nature such as the transfer of medical records, the purchase of a property, home, or other physical asset may require the use of the complete user SSID 257 to ensure and authenticate valid user identification.

The network addressing 260 function manages the physical addressing and routing information within the AXEL blockchain. Localized addressing such as communications between the private chain 295 and the respective alpha block 210 is managed through the network addressing 260 function. On a broader scale, the network addressing 260 function ensures that users participating within the AXEL blockchain can efficiently transfer, share, stream, access, store, and otherwise engage with all digital content managed and shared within the AXEL blockchain.

The network addressing 260 function works in conjunction with other functions such as the AXEL database 250 and the AXEL communications 215 (as an example) to enable a first user to establish a messaging and/or chat session with a second user. The network addressing 260 function manages functions associated with directing and routing network traffic on the AXEL blockchain.

The unified device ID info 265 function is utilized to register and authenticate the devices a user uses on the AXEL blockchain. AXEL can incorporate components of the PINApp to enable a user to unify all of the portable computing devices (such as smartphones, tablets, personal computers, and the like) with the AXEL blockchain, providing the capability of accessing any digital content residing on any connected/unified device from anywhere the user or participant travels. This provides the capability of accessing the AXEL blockchain from any device while negating the need to run blockchain gateway software on each device the user engages to access the AXEL blockchain. As an example, a user may be running the AXEL blockchain gateway software on their home PC. The PINApp allows the home PC to communicate directly with the subject user's smartphone, enabling them to access the AXEL blockchain remotely from their smartphone, negating the need to run a local AXEL gateway client on the subject smartphone.

The unified device ID info 265 function works in conjunction with the AXEL database 250 function to ensure device identification is properly logged and available for access. This function can prevent a user from accessing the AXEL blockchain from an unauthorized device, even if they enter the correct user ID information and associated password(s) and pin codes. As previously stated, privacy, security, and trust between nodes are vital to the functional implementation of the AXEL blockchain. By limiting access to only verified and authenticated users utilizing only authenticated and verified devices, AXEL can guarantee the user within the network is valid. As discussed above, while AXEL may operate with this described security implementation, any variation of security that is desired would be compatible with AXEL. For example, it may be desirable in certain instances to include more or fewer factors of authentication.

The AXEL DCA—Security 285 function works in conjunction with functional elements 201 within the AXEL blockchain. The DCA utilizes a multi-factor algorithm to ensure the positive identity of a user wishing to access the AXEL blockchain, as well as verifying the device in which the user is utilizing to gain access. The unified device ID info 265 function enables the AXEL DCA—Security 285 function to see the physical identity and/or machine code addressing of each device utilized to connect to or otherwise access the AXEL blockchain. If the AXEL DCA is utilized, Security 285 function will only accept an authorized login attempt from an authorized user or participant utilizing an authorized device. It is contemplated that the security setting could be configured in any manner desired. More or fewer authentication factors could be used. Any variation in the login attempt such as a wrong device, wrong username, wrong password, or other incorrect matching with the requirements will be rejected by the AXEL DCA—Security 285 function.

The chain recovery 270 function works in conjunction with the private chain history 230 and the AXEL database 250 functions to restore a user private chain 295 in case of catastrophic failure. In one embodiment, a user may lose access to a gateway device such as a home computer due to a critical device failure. The chain recovery 270 function will enable that user to completely restore their private chain along with the history associated, up to and including the last verified transaction the user participated in.

As stated previously, the public chain 205 is comprised of alpha blocks 210 that may not be completely deleted otherwise removed from the AXEL blockchain. This is due to the fact that transactional information that involves other users may be stored within the alpha block 210. If it was possible to remove an alpha block 210 it could result in the absence of historical transactional information or witness administration information that could potentially have an impact outside of the first user controlling and managing the subject alpha block 210, therefore it is impossible to remove an alpha block 210 from the AXEL blockchain.

Should a user wish to delete their account or otherwise end their participation in the AXEL blockchain, their private chain 295 (up to and including the most recent transaction information) may be removed from the AXEL blockchain. However, as previously stated, the private chain 295 information is backed up to the associated public chain 205 alpha block 210 for the specified user. In a preferred embodiment, the chain recovery 270 function allows a user to recreate and/or completely restore their private chain 295, up to and including the last authenticated transaction executed prior to the private chain 295 removal.

The communications and support 275 function manages system level communications that occur within the AXEL blockchain. This includes, but is not limited to, system level error messages, client/user error messages (in response to errors made by the client/user), technical support queries and responses, alarm and/or alert messages, and the like. In one preferred embodiment, a node may be malfunctioning or generating error codes and introducing them to the AXEL blockchain. The communications and support 275 function may send an error message to the subject node alerting them of the issues and asking them to correct the problem. In another embodiment, a user and/or node may introduce a faulty block into the AXEL blockchain causing the user reputation to diminish. The user and/or node would receive a notification from the AXEL blockchain through the communications and support 275 function, notifying the user and/or node of the subject change in their network standing/reputation.

The communications and support 275 function works in conjunction with multiple functions residing on both the public 205 and private 295 chains including, but not limited to, the AXEL database 250, the private chain history 230, witness administration 240, wallet and token administration 245, user ID info 255, network addressing 260, chain communications 235, and other functions that engage networking, addressing, and communications functionality within the AXEL blockchain.

The storage/CPU/mining 280 function governs three specific client functions within the AXEL blockchain. The AXEL storage/CPU/mining 280 component of the functional implementation manages the storage repositories of the registered user relating to their own personal storage as well as the storage repositories the user wishes to designate for use in a distributed network storage capability.

The AXEL storage/CPU/mining 280 function enables users to participate in a distributed decentralized network storage capability wherein users (at their total control and discretion) may choose to provide, donate, sell, or otherwise make available for network usage their spare storage space on their node and/or connected devices.

As an example, a user may express the desire to participate in the sale/lease/rental of their spare storage space on a home computer or connected drive through the AXEL blockchain network. The user will notify the AXEL blockchain of their intent to participate and provide information to AXEL as to the amount of storage space they intended to make available, the duration of the space availability, and any limitations they intend to place on the space (if any). The storage/CPU/mining 280 function will collect this information from the user and share it with the AXEL database 250 function. Any second user wishing to engage the storage space can do so through a marketplace or other resource sharing/pooling capability hosted within the AXEL blockchain.

When a user designates drive space as available to the AXEL blockchain, the alpha block 210 will engage multiple AXEL functions 201, including but not limited to the unified device ID info 265, the database 250, the user ID info 255, the chain communications 235, the wallet and token administration 245, the storage/CPU/mining 280 functions and potentially others.

The storage/CPU/mining 280 function provides a CPU pooling function to allow network users to make their CPU available for usage in virtual machine applications. In a similar fashion as shared previously with the network storage example, a user may wish to make their CPU available for virtual machine and/or aggregated computing functionality hosted within AXEL. This capability (as with the distributed decentralized storage described above) is managed through the storage/CPU/mining 280 function.

The virtual machine/aggregated computing functionality (storage/CPU/mining 280 function) enables AXEL to pool the resources of various participating nodes within the blockchain and make that processing power available to users who need more computing power than is currently available to them. Users will be notified by AXEL via the communications and support 275 and/or the AXEL communications 215 functions when their CPU is to be utilized by the AXEL blockchain to process advanced calculations on behalf of other participants in the AXEL blockchain.

As with the storage example provided previously, the storage/CPU/mining 280 function will engage multiple functions 201 within the alpha block 210 including but not limited to the unified device ID info 265, the AXEL database 250, the user ID info 255, the chain communications 235, the wallet and token administration 245 functions, and potentially others.

As an example, a first user may wish to make available both storage space and CPU processing power through the AXEL blockchain in return for tokens. This sale/rental/leasing configuration may be managed through a marketplace wherein a second user seeking these services may engage the first user selling/leasing/renting these services. In this example, the participants (first and second user) will manage details of their arrangement through the marketplace as they would in any eCommerce setting.

As a transaction is agreed to in the above example, a transfer of tokens would be managed by the wallet and token administration 245 function along with other AXEL functional elements 201 including, but not limited to, AXEL communications 215, user reputation 225, chain communications 235, witness administration 240, AXEL database 250 functions, and other functional elements 201 within the AXEL blockchain.

The AXEL mining capability managed by the storage/CPU/mining 280 function is the process in which a node participates in resolving a transaction utilizing the consensus algorithm and digitally signs the transaction, creating a new block.

Unlike traditional blockchains that incorporate a mining mechanism, the AXEL blockchain utilizes a mining pool concept (discussed in detail later in this submission) in which each participant in a subject witness (consensus) session will each receive a payment in the form of a utility token (or a relative percentage thereof) for their efforts in executing the consensus algorithm, regardless of whether they are the node that created the actual block or if they were only a participant.

As an example, the witness administration 240 function may select a group of 10 nodes randomly to perform consensus algorithm calculations to verify a subject transaction. Each of the 10 nodes participating in the consensus calculations would receive an identical payment in the form of a token (or a relative percentage thereof) provided they all reached the same consensus during the process. As discussed earlier, nodes failing to reach consensus during a transaction or otherwise introducing incorrect information into the blockchain would receive negative reputation credits for their participation and would therefore be ineligible to receive payment or positive reputation credits.

Mining and transaction consensus activities within the AXEL blockchain are governed by the storage/CPU/mining 280 function (once the witness administration 240 function has created the witness pool). It is important to note, as stated in the example above, a participant continuing to receive negative reputation may be prevented from participating in some or all activities managed through the storage/CPU/mining 280 function as well as other AXEL blockchain transactions.

As stated previously, the alpha block 210 is a component of the AXEL public chain 205. The purpose of the alpha block 210 is to give the public chain 205 visibility to the elements of the respective user necessary to ensure trust between the nodes and other users, while also ensuring a measure of privacy relating to the transactions of the individual user(s).

In general, alpha blocks 210 are publicly visible 298 but elements within the alpha blocks 210 may not be visible 299. As an example, each time a block is added to the private chain 295, the consensus result and digital signature which created the new block is updated 290 to the public chain 205 and the associated alpha block 210. Detailed information pertaining to the specifics of the transaction such as the name of a file or the file attributes and details may not be visible 299. Other information such as reputation and some components of the user network ID and addressing are publicly visible 298 as required to enable users to interact with each other and to participate in publicly available functions such as the distributed decentralized storage function, the distributed decentralized CPU (virtual machine) function, and the consensus algorithm (mining) function, and other file storage, sharing, transferring, and communications functions.

For the purpose of ensuring private transactions in a public blockchain environment, many functions 201 hosted within and associated with the alpha block 210 are hidden from public view 299. These include but are not limited to the AXEL A.I. 220, the private chain history 230, the wallet and token administration 245, the AXEL database 250, the chain recovery 270 functions, and other functionality that is of a personal and/or private nature.

Should a user or participant cancel their engagement with the AXEL blockchain or otherwise wish to delete their account and their associated transaction history, they may do so except as it relates to the integrity of maintaining historical information in support of other users in the AXEL blockchain. In no case can an alpha block 210 ever be completely removed or deleted from the AXEL blockchain.

As an example, a user may wish to delete their account and cease using the AXEL network. AXEL will remove the user's access to the public alpha block 210 and delete the private chain associated with that user entirely. The alpha block 210 will remain intact and active to ensure that transactions that occurred with the deleted user's participation (such as acting as a witness/executing consensus algorithms, mining, wallet and token exchange functions, and other aspects of functionality that impact other users) remains intact. Deleting an alpha block 210 would result in the activity of the respective user (including group activities such as witnessing transactions and digital signatures) being deleted. This would cause historical references to archived data and past transactions to fail as their references would be eliminated from the blockchain. It is for this reason the alpha blocks 210 may not be completely removed or otherwise deleted from the AXEL blockchain.

Should a user wish to restore their account and engagement with the AXEL blockchain, their original alpha block may be reactivated and their transaction history, up to the time they ceased their engagement with the network, may be restored.

As previously stated the public chain within the AXEL blockchain network works in conjunction with the private (user) chain to manage, track, and store relevant information pertaining to the transaction history and overall user engagement with the AXEL blockchain. The private chain is separated from the public chain to allow AXEL to provide a level of privacy for users enabling private transactions to occur while still maintaining the legitimacy of the consensus algorithm/digital signature component and the subsequent public ledger visibility. The public ledger can remain visible and reflect that the transactions that occurred on the private chain were verified using the consensus algorithm, even though the details of the transactions that occurred on the private chain are hidden from view.

The witness mechanism provided within the AXEL blockchain is a method in which a consensus algorithm may be executed by a group of users (nodes) designated as witnesses for the current transaction being resolved by the blockchain. Witnesses are selected randomly by the AXEL blockchain (utilizing the witness administration function discussed previously with reference to FIG. 2). In one example, the witness group size may range from 5 users (nodes) up to 20 users (nodes). In the preferred embodiment, the witness group size will be a subset of the nodes not participating in the transaction. It is contemplated that the blockchain could be configured such that the potential witness group size could be any number of users. In one embodiment, the random selection of witnesses to perform each transaction verification (consensus) session takes into account node availability, node/user reputation, and other considerations as discussed above with reference to FIG. 2.

In a typical blockchain with verifications utilizing a consensus-type algorithm, all nodes participating in the network will work simultaneously to resolve the transaction and create the subsequent block to be added to the subject blockchain. While this consensus mechanism is accurate and gives all nodes (users) visibility to the current transaction being resolved, utilizing all nodes to perform the process limits the thru-put capability of the blockchain and slows the overall rate at which transactions can be verified.

One benefit of the witness mechanism disclosed herein is that it enables multiple transactions to occur and be vetted simultaneously. This will give all users (nodes) visibility to each transaction consensus while speeding up the overall thru-put and transaction speed of the AXEL blockchain.

The witness mechanism utilized to create a group of participants to generate a consensus and create a block for the transactions performed within the AXEL blockchain will now be discussed with reference to FIG. 3. As previously stated, the typical witness pool may contain between 5 and 20 nodes (users), although the system may be configured for any number that is deemed optimal. The number of nodes (users) performing the witness mechanism with reference to FIG. 3 has been reduced to ease understanding of the witness mechanism.

Figure 3:
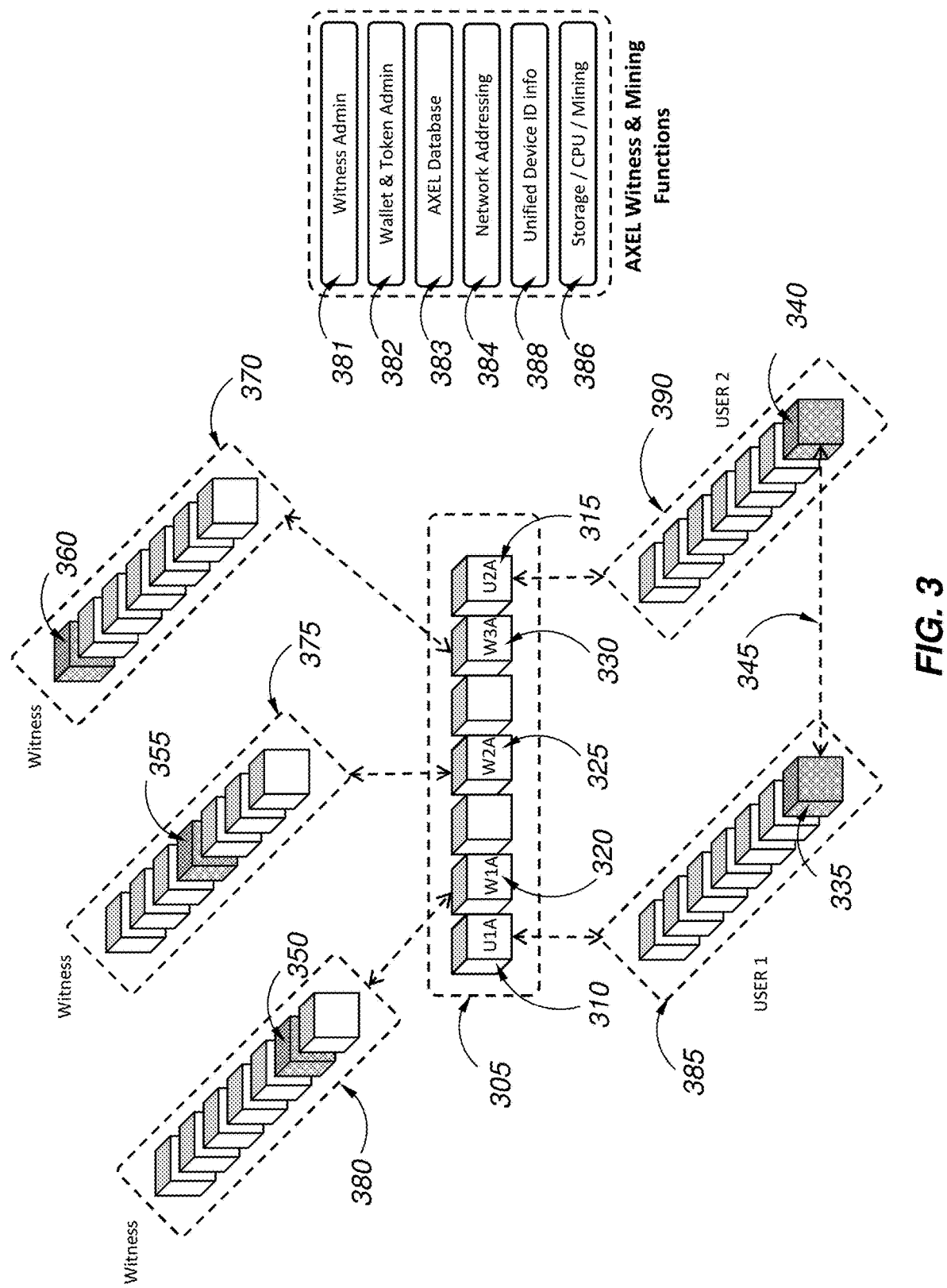
FIG. 3 is a diagram illustrating the witness function of the AXEL blockchain.

FIG. 3 represents one possible configuration of the witness mechanism of the AXEL blockchain. The process of the witness engagement begins with a transaction generated by one or more users. As can be seen in FIG. 3, user 1 as represented by the user private chain 385 engages in a transaction 345 with user 2 as represented by the user 2 private chain 390. As the transaction is executed between the two users, the user 1 alpha block U1A 310 and the user 2 alpha block U2A 315 are notified of the pending transaction. The alpha blocks 310 and 315 notify the AXEL public chain 305 through the witness administration function (discussed with reference to FIG. 2) of the pending transaction 345. The AXEL public chain 305 executing the witness administration function 381 randomly selects between 5 and 20 users (nodes) to act as witnesses in the pending transaction 345 verification/consensus session to ensure validity of the subject transaction 345 and to create a block on the referenced user chains reflecting the transaction 345. The AXEL public chain 305 will also incorporate other functional elements of AXEL including, but not limited to, the wallet and token administration 382, the AXEL database 383, the network addressing 384, the unified device ID info 388, and the storage/CPU/mining 386 functions.

With continued reference to FIG. 3, the witnesses selected to execute the consensus for the pending subject transaction 345 are witness 1 alpha block 320, witness 2 alpha block 325, and witness 3 alpha block 330. Each of the witness blocks 320, 325, and 330 will receive the transaction request and subsequent information from the user 1 alpha block 310 and the user 2 alpha block 315 and begin processing the transaction 345.

As the transaction consensus session is concluded by the witness pool (witness 1 320, witness 2 325, and witness 3 330) a new block will be created. The user 1 private chain 385 and the user 2 private chain 390 (as private participants in the subject transaction) will each create a block that provides the complete details of the subject transaction 345 and the associated approval therein. On the user 1 private chain 385, block 335 is added to reflect the transaction 345 that took place with user 2. On the user 2 private chain 390 a block 340 is created to reflect the details of the subject transaction 345 that took place with user 1.

As previously noted, the transactions within the AXEL blockchain take place in a private setting. As such, the witness blocks created to reflect the subject transaction 345 will include only the authentication and the digital identification reflecting the transaction but not the details of the transaction 345 that took place between user 1 385 and user 2 390 private chains.

As can be seen in FIG. 3, the first witness (witness 1 320) will create a witness block 350 on their private chain 380 to reflect their participation and approval of the subject transaction. In a similar fashion, witness 2 325 will also create a witness block 355 on their private chain 375, as will witness 3 330 create a witness block 360 on their private chain 370.

The witness blocks perform multiple functions within the AXEL blockchain. The primary function of the witness block is to provide ledger (chain) verification that the subject transaction took place and was verified. A second function is to ensure that a transaction that has been completed may not be altered, changed, or otherwise removed from the network to ensure multiple copies of the transaction record always exist. Due to the random nature of witness assignment within the AXEL blockchain, bad actors or users wishing to defraud the system will be unable to do so as they will not have visibility to the users (nodes) hosting the witness blocks to reflect the successfully verified and witnessed transactions. Therefore, they will be unable to access and alter, delete, or otherwise compromise the subject transactions.

The witness blocks (350, 355, and 360) are backed up and stored to their respective user alpha blocks (320, 325, and 330). This ensures there is always a record of each vetted transaction, even in cases wherein a witness private chain is deleted or a witness otherwise removes their account from the AXEL blockchain.

The user 1 private chain 385 and the user 2 private chain 390 will also update their respective alpha blocks (U1A 310 and U2A 315) with the newly added transactions represented by block 335 on the user 1 private chain 385 and block 340 on the user 2 private chain 390. Again, these blocks (335 and 340) will contain the details of the associated transaction 345 that took place.

In the event that a participant in a given transaction were to delete their account or otherwise remove their private chain from the AXEL blockchain, the transactional information will remain intact in the alpha blocks of the associated user. As shared previously, alpha blocks may not be completely removed or otherwise deleted from the AXEL blockchain to ensure integrity of all transactions that occur.

In conjunction with the witness mechanism as discussed with reference to FIG. 3, the AXEL blockchain also supports a mining pool capability that enables participants acting as a witness to verify the pending transaction to be compensated for their efforts. Such compensation may be in the form of utility tokens awarded by the AXEL blockchain.

The purpose of the utility token is to allow participants within the AXEL blockchain to engage in transactions that would normally require a method of payment such as a credit card or similar currency mechanism. One benefit of the utility token is that it acts as a substitute for the typically utilized payment mechanisms to allow AXEL to be a completely self-contained system negating the need for an external payment mechanism. As such, participants within the AXEL blockchain can buy, sell, rent and/or lease services and products from each other and utilize the utility token as a form of currency within AXEL.

The mining pool functionality will now be discussed with continued reference to FIG. 3. As discussed above, the witnesses (represented by private chains 380, 375, and 370) participated in the witness/verification of the subject transaction 345 that occurred between the user 1 private chain 385 and the user 2 private chain 390 (represented by user 1 block 335 and user 2 block 340).

As the consensus is reached and the mirror blocks 350, 355, and 360 are created on the respective witness private chains 380, 375, and 370, the respective witness alpha blocks 320, 325, and 330 notify the AXEL public chain 305 of the completed consensus and the subsequent transaction 345. The AXEL public chain 305 notifies the witness administration 381, the wallet and token administration 382, the storage/CPU/mining 386, and AXEL database 383 functions that the consensus/witness session has successfully concluded. Once the session has been verified by the witness administration 381 function, the witness administration 381 function notifies the wallet and token administration 382 and the storage/CPU/mining 386 functions of the utility token distribution to the respective witness pool. The AXEL public chain 305 will engage the AXEL database 383, the network addressing 384, the unified device ID info 388 and the storage/CPU/mining 386 functions to distribute the token reward for processing the subject transaction 345 during the current witness session.

Each witness participant represented in FIG. 3 as witness 1 320, witness 2 325, and witness 3 330 will receive a predetermined quantity of tokens or a percentage thereof based on the functional requirements of the blockchain implementation. As an example, each participant may receive one or more tokens for participating as a witness and successfully agreeing on a consensus (resulting in the creation of a new block) in support of the completion of the transaction 345.

A record of the token award to the above subject witness pool will be logged in each participant's private chain (380, 375, and 370) along with the AXEL database 383 function.

As discussed previously in this submission, the AXEL blockchain can incorporate elements of the PINApp which is incorporated herein by reference. AXEL can engage the PINApp technology to allow the unification of the storage repositories of client/user connected devices to enable access and management of the content stored on the client/user connected devices through the AXEL blockchain. This unification and connectivity to the AXEL blockchain negates the need for the AXEL blockchain gateway software to be present and functional on each of the client devices, and instead allows aggregation of both the device storage and the device access through a single gateway device. This capability enables a client/user to access, manage, transfer, and stream a file (as an example) that exists on a smartphone to a second user/recipient through the AXEL blockchain without having the subject file physically located on the gateway device. While PINApp provides certain advantages, it is contemplated that other systems with similar capabilities of PINApp could be utilized as well.

The implementation of the PINApp technology with the AXEL blockchain will now be discussed with reference to FIG. 4. The following discussion on the PINApp implementation will be limited to functional aspects required to support the AXEL blockchain and the associated preferred embodiments.

Figure 4:
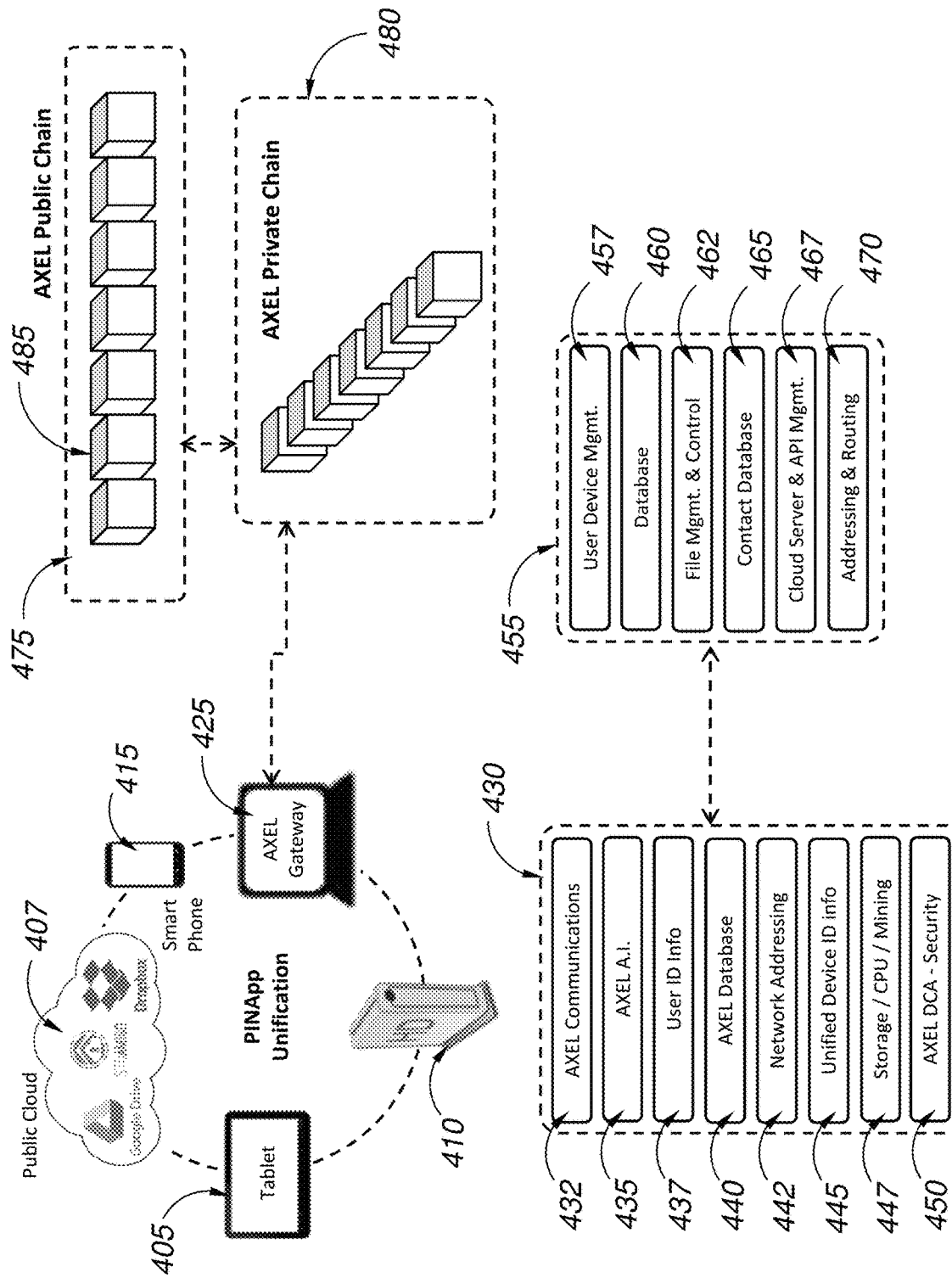
FIG. 4 is a diagram illustrating the PINApp unification and associated functions of the AXEL blockchain.

With reference to FIG. 4, a personal computer 425 is connected through the PINApp to a tablet computer 405, an external hard drive 410, a smartphone 415, and one or more public cloud services 407. The personal computer 425 is running the AXEL gateway and is utilizing the AXEL functions 430 to communicate directly with the PINApp functions 455. As stated previously, the unification as described above makes digital content residing on each of the reference devices available to each other and available to the personal computer 425 running the AXEL gateway. As an example, a file (not pictured) residing on the tablet 405 is available to the personal computer 425.

The functional elements of AXEL 430 and their engagement with the functional elements of PINApp 455 will now be discussed. The number of functional elements of AXEL 430 and PINApp 455 have been reduced down to provide clarity to the preferred functions.

With continued reference to FIG. 4, the AXEL communications 432 function works in conjunction with the PINApp 455 functional elements to pass information between the two systems. The AXEL communications 432 function engages with represented PINApp 455 functional elements (user device management 457, database 460, file management and control 462, contact database 465, cloud server and API management 467, and addressing and routing 470 functions).

As an example of the engagement between the PINApp 455 and AXEL 430 functional elements, we assume a user (not pictured) who owns the list of devices (personal computer 425, smartphone 415, public cloud 407, tablet 405, and external hard drive 410) wishes to share a photograph (not pictured) that resides on smartphone 415 to the AXEL private chain 480 and subsequently the AXEL public chain 475.

The following example process (with continued reference to FIG. 4) assumes that both the PINApp 455 and the AXEL 430 functional elements, in conjunction with the personal computer 425 running the AXEL gateway, have verified and authorized the subject user prior to allowing them access to execute the following functional example.

The process begins with the personal computer 425 running the AXEL gateway sending a query from the AXEL database 440 function through the AXEL communications 432 function to the PINApp database 460 function to identify the photo being shared and the device (smartphone 415) the subject photo resides on. The PINApp database 460 function (knowing the location of the subject photo residing on the smartphone 415) will engage the file management and control 462 and the addressing and routing 470 functions to provide the AXEL database 440 function information on the exact location, file name, file address, and other associated data disclosing that the subject file resides on the smartphone 415.

The AXEL communications 432 function will share the location information with the AXEL database 440, the AXEL A.I. 435, the network addressing 442, and the unified device ID info 445 functions. These functions will enable the AXEL database 440 function to record and verify the location (smartphone 415) of the subject photo as shared by the referenced PINApp 455 functional modules.

Now that the personal computer 425 running the AXEL gateway has established that the location of the photo is the smartphone 415, the user (not pictured) may share the subject photo through the private chain 480 and subsequently the public chain 475. The recipient (not pictured) will access the subject photo directly from the user smartphone 415, negating the need to relocate, copy, move, or otherwise transfer the photo to a secondary-type repository.

By enabling the PINApp to work directly with the AXEL blockchain users can store, share, stream, and transfer digital content residing on any of their devices through the AXEL blockchain without the requirement to physically move or copy the respective digital content.

In a similar fashion as described above, any digital content residing on any of the devices (tablet 405, public cloud 407, external hard drive 410, smartphone 415, or even the personal computer 425 hosting the AXEL gateway) may be accessed and managed through the AXEL blockchain by the digital content owner hosting the subject digital content on the above referenced connected (utilizing PINApp) devices.

In another embodiment of the engagement with the functional elements of the PINApp 455 and AXEL 430 it may be assumed that a user controlling the subject connected devices (tablet 405, public cloud 407, external hard drive 410, smartphone 415, and the personal computer 425 hosting the AXEL gateway) chooses to engage in selling their spare storage space to other users in exchange for utility tokens through the AXEL blockchain. As with the above example, the following example assumes the subject user has already accessed their AXEL blockchain account and has engaged the PINApp and associated security and vetting protocol has been satisfied.

With reference to FIG. 4 the process will begin with the user (not pictured) notifying their referenced alpha block 485 on the AXEL public chain 475 of their desire to participate in the sale of storage resources within the AXEL blockchain. This function will typically occur through an environment such as a marketplace (not pictured) that resides on the AXEL blockchain allowing users to sell extra resources they own and manage for utility tokens.

The marketplace (not pictured) will query the user as to the amount of storage space they wish to make available for sale, the address location of the storage, and the time period or other restrictions the user/seller wishes to place on the sale/lease of the subject storage space.

The user may be accessing the marketplace (not pictured) from any of their reference connected devices, but for the purpose of clarity we will assume the user is utilizing the personal computer 425 hosting the AXEL gateway to configure the storage sale or lease. The user will notify the AXEL blockchain that they wish to make the storage of their external hard drive 410 available for sale or lease to other users within the AXEL blockchain. The AXEL communications 432 function will engage the personal computer 425 and the PINApp 455 functional elements to determine the location and addressing information of the storage space on the external hard drive 410 being put up for sale or lease.

Since the device (external hard drive 410) is connected to the local user network via the PINApp 455 functions, the AXEL communications 432 function will query the PINApp database 460 function to determine the location of the storage of the external hard drive 410 within the unified network. The PINApp database 460 function, knowing the address location of the external hard drive 410 will engage the user device management 457, the cloud server and API management 467, the contact database 465, and the addressing and routing 470 functions to notify the AXEL functional elements 430 of the location of the associated external hard drive 410.

Now that the location of the external hard drive 410 is known to the AXEL blockchain, the user (via the personal computer 425 running the AXEL gateway) will provide information to both AXEL 430 and PINApp 455 functional elements pertaining to the user being assigned access to the external hard drive 410 through the AXEL blockchain. Information such as user identification, email address, network address, login, and other access information will be provided to both the AXEL 430 and the PINApp 455 functional elements. The second user (leasing the storage space) access information (identification, email, network addressing, and login) will be added to the AXEL database 440 and to the PINApp database 460 functions. This information will also be available to and managed from the PINApp contact database 465, the cloud server and API management 467, the addressing and routing 470, and file management and control 462 functions under the PINApp 455 functional elements, as well as through the user ID info 437, the AXEL database 440, the network addressing 442, the unified device ID info 445, the storage/CPU/mining 447, and the AXEL DCA—Security 450 functions under the AXEL 430 functional elements.

Once the above transactions have been completed, a secondary user (not pictured) may be given access to the subject external hard drive 410 from a remote location from their own devices (not pictured). This secure access will be managed by, and limited to, the provisions as defined under the agreement through the marketplace (not pictured).

Functional elements as described above work in a variety of fashions to ensure the owner of the subject external hard drive 410 and the secondary user utilizing the storage space (not pictured) can maintain their privacy and security while enabling a level of trust to exist between devices since transactions associated with the AXEL blockchain are stored on the private ledger of each participant as discussed earlier in this submission.

As with other distributed and decentralized technologies currently being deployed, the AXEL blockchain does not incorporate a typical client-to-server relationship. The network capability including management of storage and computing resources are provided by users who create nodes to support the network. Therefore, resource management must be handled by the nodes in conjunction with the AXEL blockchain.

The management of network resources such as the availability of user/node provided CPU processing power (supporting the distributed computing function) and the availability of user/node provided storage space (supporting the distributed storage function) within the AXEL blockchain is actively monitored and reported by a resource assessment algorithm.

The resource assessment algorithm routinely queries the AXEL blockchain to determine resource allocation related to both CPU and storage usage as well as to determine the appropriate pathing and trafficking of transactions that occur within the AXEL blockchain.

The resource assessment and traffic pathing capabilities of the AXEL blockchain will now be discussed with reference to FIG. 5. The diagrams utilized to detail the functional elements of the resource assessment and traffic pathing have been limited to provide clarity of the preferred embodiments. It will be apparent to someone skilled in the art that other capabilities and functional elements exist within the representations and discussions related to the resource assessment and traffic pathing capabilities discussed below with reference to FIG. 5.

Figure 5:
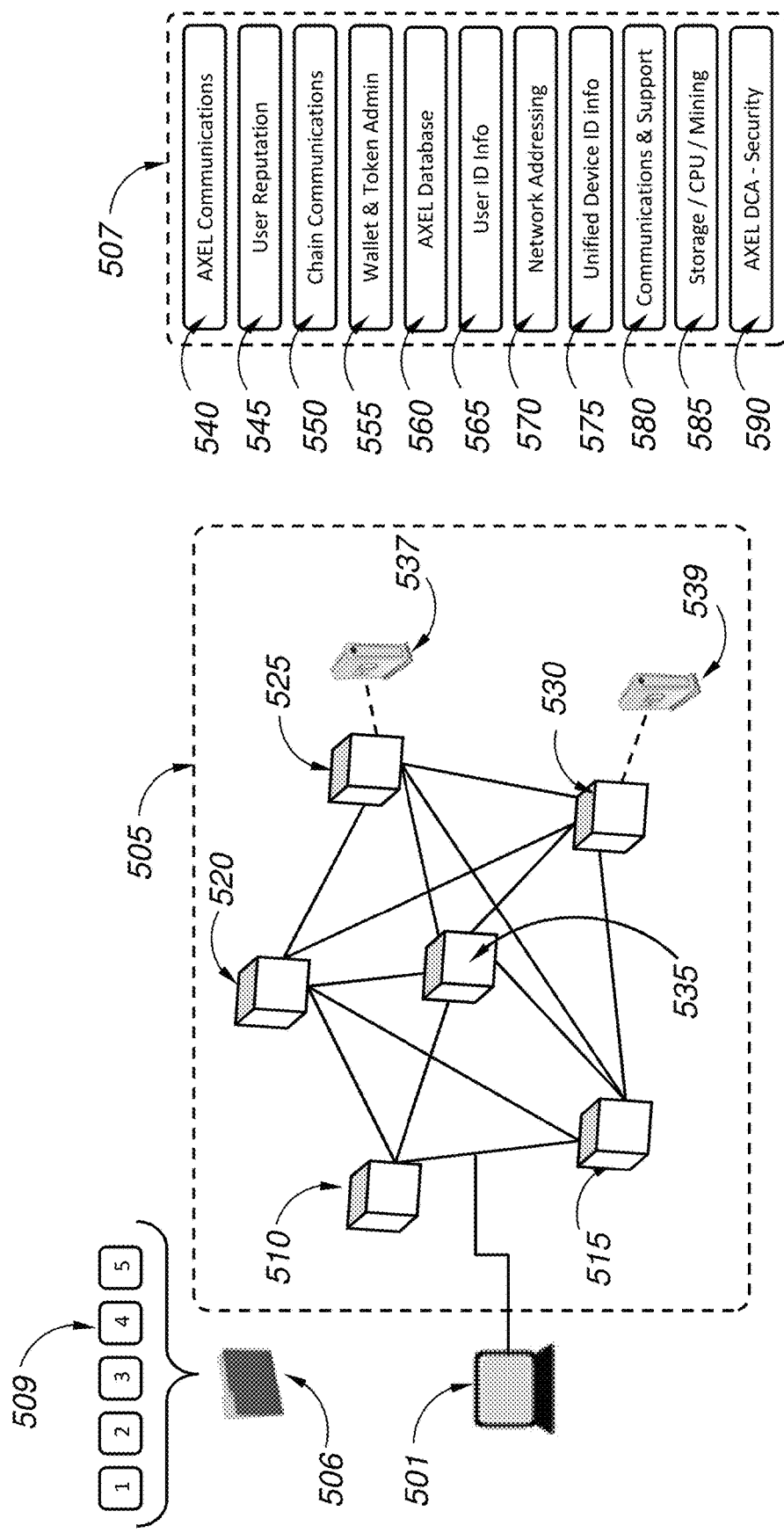
FIG. 5 is a diagram illustrating the resource assessment algorithm function.

As can be seen in FIG. 5, the AXEL blockchain 505 is comprised of nodes (510, 515, 520, 525, 530, and 535) that are owned and managed by users/participants within the AXEL blockchain 505. A node (510, 515, 520, 525, 530, and 535) may be a computer or other computing device having one or more processors and one or more storage devices, or access thereto. Node 525 and node 530 are participating in the sale of storage space as reflected by the connected storages 537 (for node 525) and 539 (for node 530). This is in support of the decentralized distributed storage capability of the AXEL blockchain 505 as previously discussed.

In one preferred embodiment, the resource assessment algorithm will periodically query the network (each node pictured 510, 515, 520, 525, 530, and 535) to determine the amount of unused (available) storage and compare that with the amount of storage that is currently being used by participants within the AXEL blockchain 505. The resource assessment algorithm will further run a comparison against storage use history to determine if the currently available storage (unused and available) is satisfactory to support what the algorithm determines as pending needs for the network.

As an example of the above embodiment (and with continued reference to FIG. 5) the storage/CPU/mining 585 function engages the chain communications 550, the AXEL database 560, and the AXEL communications 540 functions to query each of the nodes 510, 515, 520, 525, 530, and 535 to determine the currently available amount of storage the AXEL blockchain 505 can support. The feedback from the resource assessment process provides the network addressing 570, user reputation 545, and unified device ID info 575 functions to enable AXEL to determine (a) the location of the available storage repositories, (b) the amount of storage available and (c) the address and location information of the provided storage resource(s).

In a situation wherein the network resource (such as storage in this example) is satisfactory to support the network needs as determined by the resource assessment algorithm, no further action will be taken by AXEL. In a situation wherein the network resource is not satisfactory and more resource is needed, one or more nodes (including nodes currently providing storage such as nodes 525 and 530) will be notified of the need to add storage resources.

Since these nodes are independently operated by users on the AXEL blockchain, they will be invited to participate in supporting network resource needs in exchange for utility tokens (utility tokens) that are used as a form of currency within the network itself. The addition of network resources (such as additional storage space) is entirely at the discretion of the node operator. Should the nodes decide not to add more resources (such as storage) the AXEL blockchain will allow the remaining storage capability to be utilized until such a time as it is at capacity. Once capacity has been reached, the AXEL blockchain will disallow further requests for distributed storage until such a time as resources allow more storage to be provided by the network.

The resource assessment algorithm works in conjunction with other AXEL functional elements 507 to both collect current and relevant statistical information pertaining to the resource availability of the AXEL blockchain 505 as well as to compare and parse this information with historical information to determine the network needs for current and future resource allocation.

As an example (and with continued reference to FIG. 5) once all of the nodes have been queried by the resource assessment algorithm (as discussed above), the algorithm (controlled by the storage/CPU/mining 585 function) will engage the AXEL database 560 function to collect and parse information relating to historical resource assessment queries to determine network needs.

As discussed earlier, nodes both deploy and control network resources such as storage (as depicted by node 525 with storage 537 and by node 530 with storage 539) and CPU usage for virtual machine capability (not pictured). Both of these resource needs, along with a variety of others are managed through the resource assessment algorithm function.

Network node-provided resources are governed by not only the resource assessment algorithm, but the user reputation associated with the node(s). As discussed earlier in this submission, node reputation governs the extent at which a node can engage in activities such as providing a witness function, providing decentralized storage for the AXEL blockchain, or providing the CPU capability supporting the distributed computing mechanism (virtual machine capability). As an example (and with continued reference to FIG. 5) the storage/CPU/mining 585 function will initiate a resource assessment process for the AXEL blockchain 505. As the assessment begins, the storage/CPU/mining 585 function will query the AXEL database 560 function to collect information pertaining to the AXEL blockchain 505. The reported information from the database 560 function will include (but is not limited to) the user reputation 545, the user ID info 565, the network addressing 570, the unified device ID info 575 functions, and other associated information to enable the resource assessment algorithm to determine the necessary criteria pertaining to each individual node (510, 515, 520, 525, 530, and 535). Once the information is collected and parsed by the resource assessment algorithm (controlled by the storage/CPU/mining 585 function), the algorithm will be able to determine (a) the reputation status of each node, (b) the resources available from each node, and (c) any additional qualifying information needed to make the recommendation to support the current or pending needs of the AXEL blockchain 505.

Assuming all of the nodes within the AXEL blockchain 505 are of an acceptable reputation level (as managed by the user reputation 545 and the AXEL database 560 functions), they will be notified through the chain communications 550 and the communications and support 580 functions of the pending needs of the AXEL blockchain 505 and be invited to participate in providing the required resource. Should a node be disqualified because of a negative reputation (as determined by the user reputation 545 and AXEL database 560 functions) they may be excluded from the network message inviting nodes to participate in providing additional resources. As previously stated, nodes that fall into disfavor within the AXEL blockchain 505 (through negative reputation) will be notified (through the chain communications 550 and the communications and support 580 functions) of their negative reputation and provided guidelines in which the reputation may be repaired. Long-term negative reputation or continued violations may result in the node being removed from participating in network functions, up to and including node deactivation.

As a component of the resource assessment algorithm, the AXEL blockchain 505 provides a mechanism in which transactional traffic can be governed and managed to reduce transaction times while abiding the needs of both the users and the network architecture. Intentionally redundant, the AXEL blockchain 505 (utilizing the resource assessment algorithm) factors into account aspects such as resource allocation, node reputation, node location, ping response times, and other elements to determine how best to manage transactional traffic through the blockchain. This process within the AXEL blockchain 505 is referred to as "weighting" and the above referenced variables determined through the resource allocation algorithm are utilized to determine the proper transaction pathing for a given transaction.

As an example of the weighting process managed through the resource assessment algorithm (and with continued reference to FIG. 5) a first user represented by node 510 wishes to access remote storage 539 being provided by a second user represented by node 530. The resource assessment algorithm will first determine if the storage space available at storage 539 via node 530 is suitable for the needs of the first user node 510. Secondly, the algorithm will determine the reputation of the node 530 to verify that it is within an acceptable level to support the network requirements. Third, the algorithm will send a ping-type signal to test the transaction speeds between the corresponding nodes to determine the fastest route possible for the traffic, while also taking into account the reputation of each node. As the ping-type signal is executed from node 510 it will be sent to node 520, 515, and 535. Assuming all nodes are functioning properly and all nodes are reporting a favorable transaction time and node reputation, the resource assessment algorithm (via the weighting process) will determine the fastest route to engage the storage 539 hosted by node 530.

Using the above example, we now assume that node 535 has a negative reputation. As the ping-type signal is executed from node 510 it will again be sent to node 515, 520, and 535. Node 535 will report the negative reputation which will require the resource assessment algorithm (weighting process) to either choose the pathing through node 515 or through node 520. It is important to note that secondary speeds are also considered in determining the most efficient pathing to support transactions.

As an example of the above embodiment, the resource assessment algorithm will seek a complete speed test utilizing the ping-type signal method engaging all nodes and all paths illustrated within FIG. 5. The shortest path meeting the needs of the AXEL blockchain 505 and the reputation requirements will be chosen.

The AXEL blockchain provides a distributed decentralized CPU processing capability that enables multiple nodes to engage in processing against a user-required program in instances where additional processing power is needed to satisfy the user need. Functioning in a similar fashion to the distributed and decentralized storage capability (discussed below with reference to FIGS. 6 and 7), the CPU processing capability is a shared resource tool enabling network users to speed processing times of large processing jobs through the utilization of the AXEL blockchain.

The distributed decentralized CPU processing capability follows the same rules as the resource assessment algorithm with reference to traffic, pathing, node engagement, user reputation, and other functional aspects pertaining to the usage of the AXEL blockchain. The distributed decentralized CPU processing capability of the AXEL blockchain will now be discussed with continued reference to FIG. 5.

A user 501 has a computer processing job 506 that needs to be executed. The processing job 506 is broken down into sections 509 by the AXEL blockchain 505. These sections 509 are then distributed to the nodes participating in the AXEL blockchain 505 CPU processing capability. As an example, the nodes receiving the sections 509 to be processed may be nodes 510, 515, 520, 525, and 530. As the processing job 506 is completed, the resulting sections 509 will be reconstructed by the AXEL blockchain 505 into a single file 506 and returned to the user 501.

The process is governed by the storage/CPU/mining 585 function and the associated AXEL functions 507 including (but not limited to) the AXEL communications 540, the user reputation 545, chain communications 550, AXEL database 560, user ID info 565, network addressing 570, and the AXEL DCA—Security 590 functions.

The distributed decentralized CPU processing capability (managed through the storage/CPU/mining 585 function) takes into account available resources, user reputations, and transaction times within the AXEL blockchain.

The AXEL blockchain provides a decentralized distributed storage capability that enables users to purchase and sell storage space that is attached to or otherwise managed through their AXEL blockchain connected device(s). In general functional terms, as a user engages the AXEL blockchain storage, digital content (such as a file) may be broken into multiple smaller parts, and then each of the parts may be encrypted to ensure both privacy and security of the stored content as well as to facilitate redundant storage wherein a component or part of a disassembled and encrypted file may reside on multiple storage repositories. The storage mechanism is governed by the AXEL blockchain and deployed and managed by the individual users participating in the sale of storage space within the network.

The decentralized and distributed storage capability will now be discussed with reference to FIG. 6. While FIG. 6 is limited to show only the primary components and functional aspects of the storage capability, it will become apparent to one skilled in the art that other embodiments exist within the representation.

Figure 6:
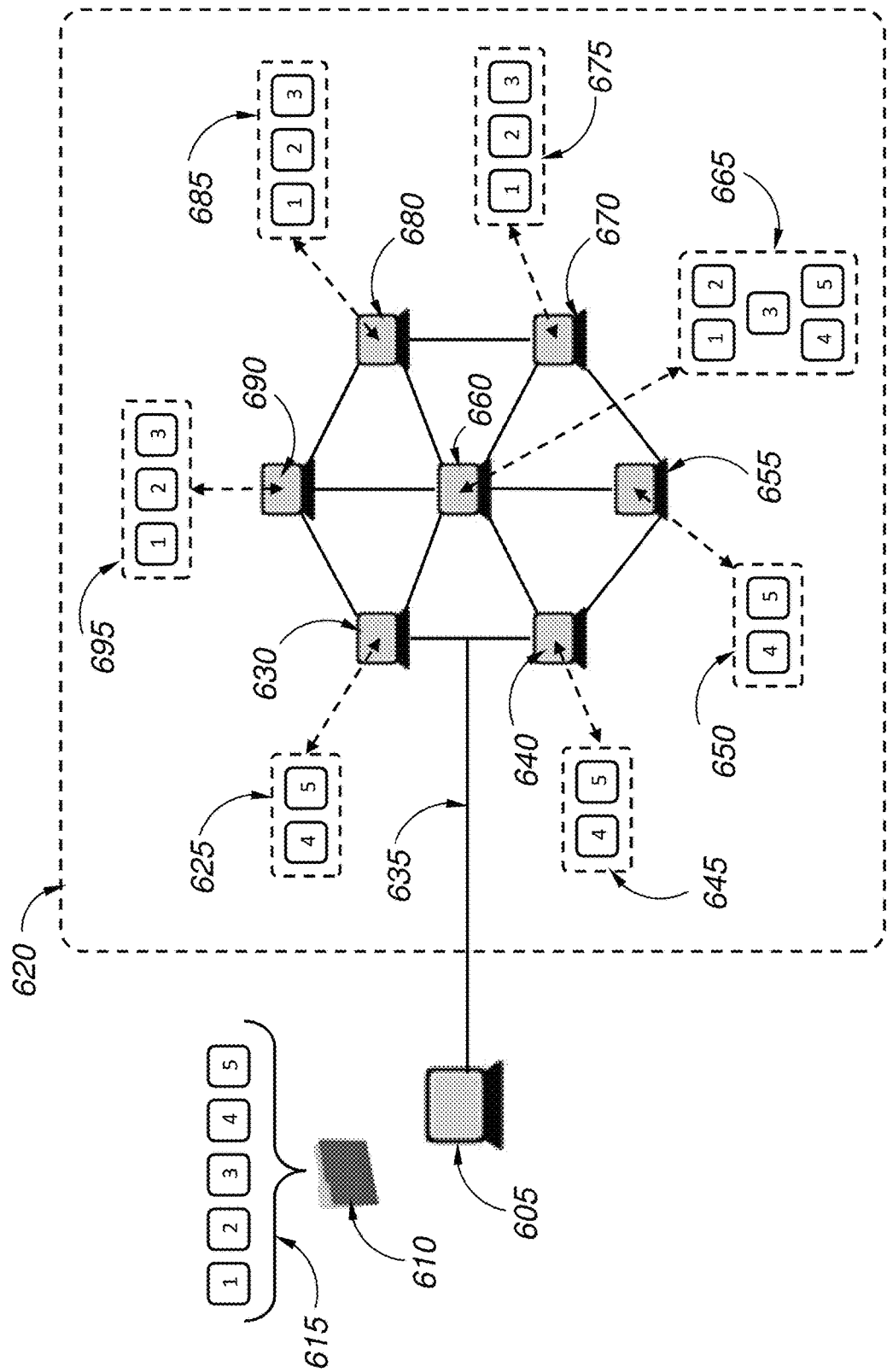
FIG. 6 is a diagram illustrating the distributed storage function within the AXEL blockchain.

As can be seen in FIG. 6 a user 605 is connected 635 to the AXEL blockchain 620. The AXEL blockchain 620 has seven nodes 630, 640, 655, 660, 670, 680, and 690 that are participating in the decentralized and distributed storage capability of the network. The user 605 has a file 610 that they wish to store on the AXEL blockchain 620. The file 610 is broken down into five separate parts 615. It is important to note that the number of parts a file will be broken down into varies based on a number of factors including (but not limited to) file size, file type, storage type (i.e. short term, long term, glacial, etc.), and other factors. The file 610 was broken into five parts 615 to ease explanation of the associated storage functionality.

Once the file 610 has been broken down into component parts 615 it is then encrypted. Once encrypted, it is distributed to the AXEL nodes (630, 640, 655, 660, 670, 680, and 690) for storage. As can be seen in FIG. 6, the file component parts 615 are stored in a redundant fashion as illustrated by node 630 storing file parts 4 and 5 (625) while node 640 is storing the identical file parts 4 and 5 (645). The purpose of the redundancy is to ensure that if a node suffers a failure or the file parts should become unavailable for any reason, the AXEL blockchain 620 can enable the user 605 to retrieve them in their entirety. The quantity and location of each file part will vary greatly depending on multiple factors including (but not limited to) the number of nodes in the network that are providing storage, the availability of storage for the user 605 to access, the geographic location of the storage, the transaction speed based on the ping-type signal measurements between nodes, and other factors that govern traffic and user reputation.

Nodes 670, 680, and 690 host the identical encrypted file parts (1, 2, and 3) shown as 675, 685, and 695 respectively, while node 660 has stored the entirety of the file parts (1, 2, 3, 4, and 5) as shown 665. As previously stated, the example referenced in FIG. 6 is a typical configuration of a digital content storage method, but may vary dramatically depending on the variables as described above.

Digital content access, retrieval, and deletion managed through the AXEL blockchain will be administrated through the storage/CPU/mining function (not pictured) that was discussed previously with reference to FIG. 5. The storage/CPU/mining function will work in conjunction with the resource assessment algorithm (as discussed previously in FIG. 5) to determine the fastest possible pathing to support digital content access, retrieval, and deletion. Unlike many distributed network architectures, the AXEL blockchain will verify the complete deletion of all digital content parts regardless of location, assuming the storage repository is available and connected to the network at the time of access.

As previously stated, nodes are independently owned and operated by users within the AXEL blockchain. As such, they may choose to remove themselves from service with little or no warning at any given time. The resource assessment algorithm working in conjunction with the storage/CPU/mining function discussed previously will continuously verify the storage repositories and their associated contents to ensure that stored digital content is available to the users who own and manage them. In situations wherein a node is no longer available, the AXEL blockchain (utilizing the resource assessment algorithm in conjunction with the storage/CPU/mining function) will respond to the missing node and recover the missing stored content by copying the missing content (file parts) from a secondary storage point to one or more additional storage points (repositories) to ensure that the content remains available and backed up.

The storage recovery capability will now be discussed with reference to FIG. 7. As with other discussions and figures provided herein, it is important to note that it will be apparent to one skilled in the art that other functionality exists within the given functional discussion, but has been limited to ease understanding of the preferred embodiments.

Figure 7:
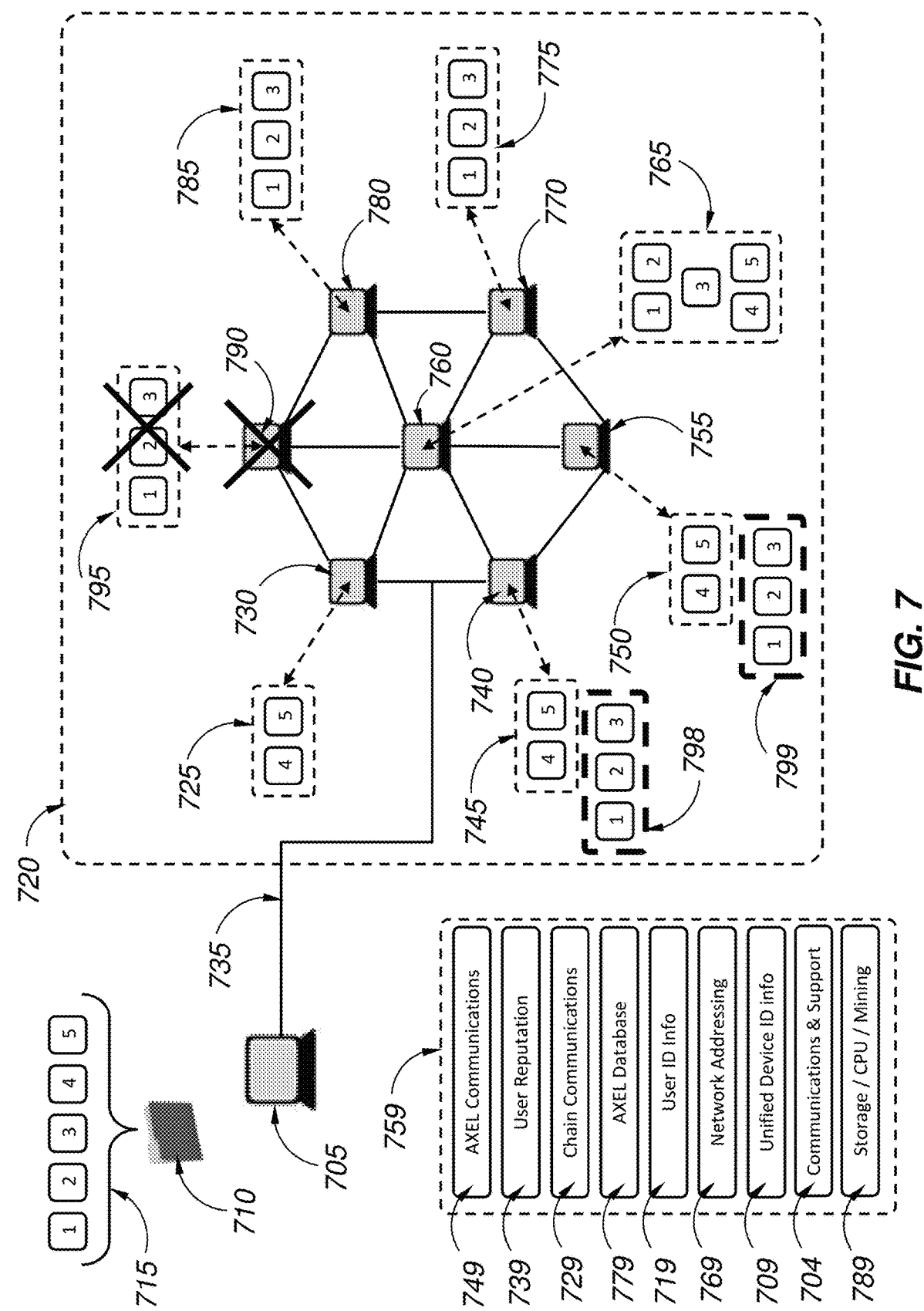
FIG. 7 is a diagram illustrating the redundancy of the distributed storage function.

As can be seen in FIG. 7 a user 705 has a need to store a file 710. As discussed previously with reference to FIG. 6, the file is broken down into parts 715 and encrypted prior to being stored within the AXEL blockchain 720. The portions of the file (as with previous discussions in FIG. 6) are stored throughout the network on nodes 730, 740, 755, 760, 770, 780, and 790.

As can be seen in FIG. 7, node 790 and subsequent storage 795 has gone offline or has otherwise become unavailable to the AXEL blockchain 720 network. The resource assessment algorithm (managed through the storage/CPU/mining 789 function) has detected the node outage (790 and storage 795) and sends a request to the AXEL database 779 function to determine (a) what node and subsequent storage repository has gone offline, (b) what content was stored there and (c) the network address of a working storage repository wherein the missing file parts in storage 795 (1, 2, and 3) can be found. The AXEL database 779 function will provide the requested information, notifying the storage/CPU/mining 789 function that the missing file parts in storage 795 (1, 2, and 3) may also be found at node 780 in storage 785, node 770 on storage 775, and on node 760 in storage 765.

The storage/CPU/mining 789 function will then engage the resource assessment algorithm to query the entire AXEL blockchain 720 network to determine the best location to create additional backup copies of the file parts from storage 795 (1, 2, and 3) that have gone offline. The resource assessment algorithm (in this example) reported that both node 755 and node 740 were/are suitable to support backup copies of the unavailable file parts from storage 795 (1, 2, and 3). The storage/CPU/mining 789 function will then copy the missing file parts from storage 795 (1, 2, and 3) from an existing location (storage 785 from node 780 as an example) and place them into one or more storages as indicated by storage 798 at node 740 and storage 799 at node 755. The quantity and location of the backup storage repositories (as previously stated) will be determined by the resource assessment algorithm. The algorithm will take into account transaction times and speeds, ping rates between nodes, user reputations, available space, and other attributes to determine the most suitable location for the backup file parts.

As previously discussed, anytime a node is utilized to support storage (such as described above) multiple functional components 759 of the AXEL blockchain 720 may be engaged. These functions can include (but are not limited to) the AXEL communications 749, user reputation 739, chain communications 729, AXEL database 779, user ID info 719, network addressing 769, unified device ID info 709, communications and support 704, and the storage/CPU/mining 789 functions.

The AXEL blockchain provides advanced user identification capabilities that allow transactions to occur within the blockchain that would otherwise require face-to-face interaction to ensure identity and transaction verification. Often referred to as AML/KYC (Anti-Money Laundering/Know Your Customer) capabilities, the AXEL blockchain incorporates a user identification mechanism that will allow (when desired based on the nature of the transaction and/or for compliance with laws and regulations) two or more users to participate in a transaction across the blockchain, such as a purchase of an automobile or other high cost item, without the requirement that all parties are in the same place to facilitate the transaction.

The user identification mechanism (AML/KYC function) can be used to support transactions that may require compliance with local, state, federal and/or international laws, as well as ensuring geographical areas under sanction by another governing body can be prevented from participating within the network as governing laws may require or mandate.

In one advantageous embodiment, the user identification (AML/KYC) mechanism utilizes portions of the Digital Certification Analyzer (DCA) U.S. Pat. Nos. 9,419,965; 9,565,184; and 9,723,090 to perform verification of the user and the device being utilized by the user. The user identification mechanism is designed to be implemented in layers within the AXEL blockchain. As an example, a user may be required to only provide an email address and other identification to participate in the network if they choose not to operate a node or to otherwise not participate in providing functional services to support the network such as the distributed computing/CPU capability or the distributed storage capability. Conversely, a user wishing to provide these types of services through the AXEL blockchain may be subject to further identification and verification such as (but not limited to) passport number, driver's license number, photo ID, or more distinct and descript identification information to ensure that the party's identification can be verified.

The user identification (AML/KYC) mechanism can utilize components of both the PINApp and the DCA to collect and manage information associated with both the user participating in the network as well as the device(s) utilized by the user to engage the network.

Figure 8:
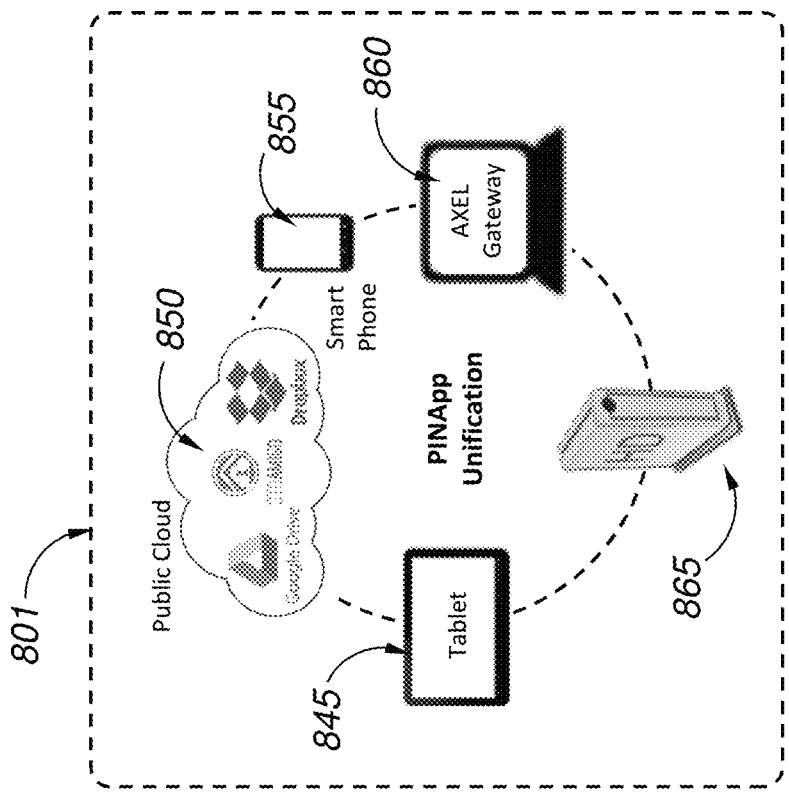
FIG. 8 is a diagram illustrating the security and user identification functions utilizing the DCA within the AXEL blockchain.
Figure 8:
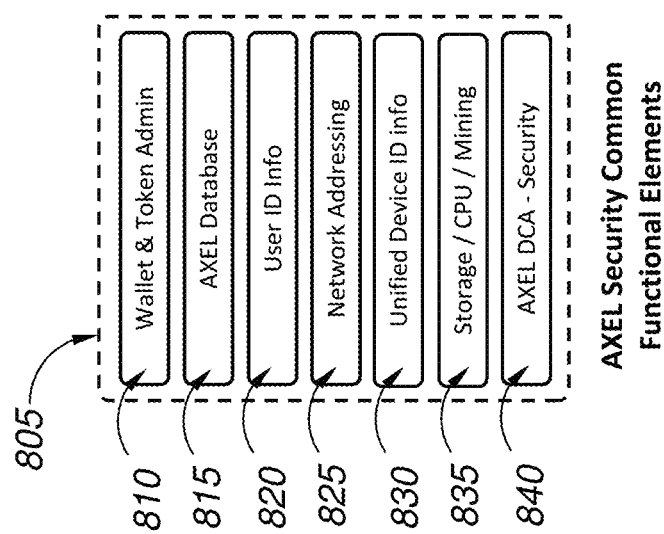

The functional aspects of the user identification within the AXEL blockchain will now be discussed with reference to FIG. 8. As with other discussions provided in this submission, it will become clear to one skilled in the art that other implementations of the stated technology and functionality exist within the discussion. The discussion with reference to FIG. 8 is limited to add clarity to the preferred embodiments. The following discussion assumes the subject user has created an account within the AXEL blockchain and has registered their associated user devices within AXEL.

As can be seen in FIG. 8, the user local network 801 shows the unification (connection to each other) of each of the user devices: tablet 845, public cloud storage repositories 850, smartphone 855, personal computer 860 running the AXEL gateway software, and an external hard drive 865. Each of the unified devices have been registered to the AXEL blockchain utilizing the PINApp unification functionality.

PINApp reports the device identification of each of the subject user devices (tablet 845, public cloud storage repositories 850, smartphone 855, personal computer 860 running the AXEL gateway software, and an external hard drive 865) to the AXEL database 815 function. This information is stored within the AXEL database 815 function in conjunction with the user account creation and login information.

As an example of the functional elements during a login session wherein the user is seeking to gain access to the AXEL blockchain, we assume the user is logging into their account through the tablet 845. The user will enter their login criteria and submit it to the AXEL DCA—Security 840 function. The AXEL DCA—Security 840 function will engage the AXEL database 815 function to authenticate information including (but not limited to) the user login information, the tablet 845 unified device ID info 830, the network address 825 of the tablet 845, the user ID info 820, and potentially other functional elements to verify (a) the user credentials and (b) the device authorization. Should a user provide a valid user identification and an invalid device authorization, the login attempt will fail. Conversely, if the user identification is invalid but the device is authorized, the login attempt would again fail.

The AXEL DCA—Security 840 function will be engaged each time a user seeks to access the AXEL blockchain or any associated device, even after they have achieved a login session. As an example, we assume the user has logged into the tablet 845 as stated above. The user then wishes to access content stored on their external hard drive 865 that is unified with other client devices (tablet 845, public cloud storage repositories 850, smartphone 855, and personal computer 860 running the AXEL gateway software). As the user access request is initiated, the AXEL DCA—Security 840 function will access the AXEL database 815 function to collect the unified device ID info 830, the user ID info 820, and the network addressing 825 to ensure that the user (via tablet 845) is authorized to access the external hard drive 865.

As previously stated, the AXEL DCA—Security 840 function will verify multiple data points including (but not limited to) user identification info 820, network addressing 825, and unified device ID info 830 along with a PIN and TOKEN mechanism that is a component of the DCA to ensure the user is authorized to access the information stored on the subject external hard drive 865.

The above process will repeat through the system anytime a user wishes to engage any of the unified local network (801) devices that comprise their registered device network utilized within the AXEL blockchain.

In instances wherein a user local network 801 is providing storage (such as the external hard drive 865) for sale or usage by the AXEL blockchain, the AXEL DCA—Security 840 function will verify (utilizing the process above) both the user/owner of the storage device as well as any user(s) registered within the AXEL blockchain who is given permission to access the storage. The verification for the user(s) accessing the storage will include a check of permissions as set by the user/owner of the storage and hosted within the AXEL database 815 function. As stated previously, these permissions will be set at the time the distributed storage capability is offered publicly for use by the user/owner of the storage device.

The user verification process described above operates continuously throughout the AXEL blockchain at any time a user wishes to engage any device registered within the network. This prevents a user from logging into a network-accessible account on a registered device and then subsequently switching out that device for one that is not registered to the network.

The AXEL blockchain provides a payment and financial management mechanism (AXEL Pay) that enables a user to participate in a financial transaction without the need for the user to actively hold the currency (token) utilized on the AXEL network.

AXEL Pay allows the blockchain to engage with external financial institutions such as banks, cryptocurrency exchanges, and other financial facilitators to enable the user wallet to perform a currency exchange function automatically without the intervention of the wallet owner.

In one preferred embodiment, a user may execute a transaction within the AXEL blockchain without having any AXEL tokens (the native token for the AXEL blockchain) in their wallet. The AXEL wallet will automatically connect with the financial institution the user has pre-selected to manage the token exchange and perform this function. The external financial institution will remove currency (USD or other) from the user's pre-determined payment method (a bank account number, checking/savings account number, a debit or credit card, or other acceptable payment method) and exchange the currency for tokens to be used on the AXEL blockchain. The transaction requested by the user will then be executed through the wallet with the AXEL blockchain to pay for the subject transaction.

One purpose of AXEL Pay is to eliminate the need for a user to manually engage an external source such as a cryptocurrency exchange and move tokens between accounts in order to perform a purchase. AXEL Pay eases the adoption of blockchain technologies as it negates the need for any external currency exchange to be manually performed by a user.

Figure 9:
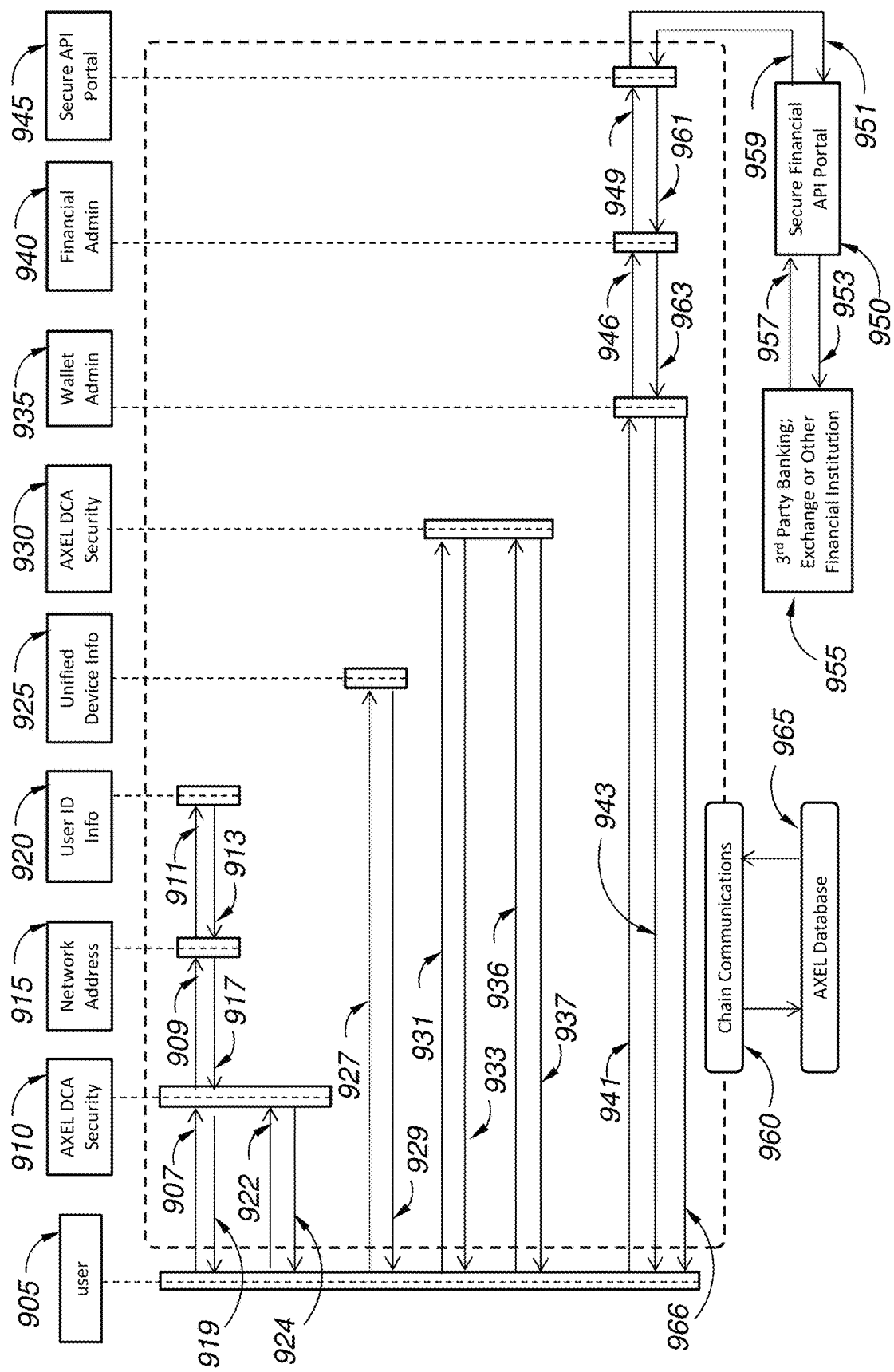
FIG. 9 is a flow diagram illustrating the functional elements of AXEL Pay.

A preferred embodiment of AXEL Pay will now be discussed with reference to FIG. 9. In an effort to make the discussion as clear as possible, some functional elements that are apparent to those skilled in the art may be omitted from FIG. 9. These omissions are purposeful and intended to provide clarity to the subject functional aspects of AXEL Pay. The following discussion assumes that (a) the user is connected to the AXEL blockchain and (b) has unified their personal devices utilizing the PINApp function discussed earlier in this submission. The discussion assumes the user is attempting to make a purchase utilizing the AXEL Pay system and method. It is also important to note that while the transactions detailed in FIG. 9 are singular in action and implementation, one skilled in the art would envision combining one or more of these transactions. FIG. 9 details the individual transactions to highlight detail of a preferred embodiment. Additionally, one skilled in the art would understand that although the component function and modules detailed in FIG. 9 (and throughout the submission) are specific to individual functions, one or more of these may be combined.

With reference to FIG. 9, a user 905 will be required to provide a primary identification to allow the AXEL blockchain to authorize the user 905 to access the functional elements of AXEL Pay. The user 905 will begin the process by sending their proprietary login credentials 907 and engaging the AXEL DCA security 910. The AXEL DCA security 910 will engage 909 the network address 915 function to seek and identify the network address that is associated with the user 905 proprietary login information. The network address 915 function will query 911 the user ID info 920 module. Assuming the user 905 login credentials are authentic, the user ID info 920 will acknowledge the user login attempt 913 to the network address 915 module. The network address 915 module will then respond 917 to the AXEL DCA security 910 that the login credentials are valid. The AXEL DCA security 910 will then return a prompt 919 to the user 905 initiating a primary connection session, requesting authentication via a multifactor code and requesting the user 905 enter a proprietary PIN code to ensure user authentication. The user 905 will return 922 the PIN code along with the requested multifactor authentication sequence to the AXEL DCA security 910 to authorize access to the primary functions of the account. Once authenticated, the AXEL DCA security 910 will return an acknowledgement 924 establishing a primary secure connection session allowing the user 905 access to the functional elements of their AXEL blockchain account.

Now that the user 905 has received an authentication 924 to create a secure connection with their AXEL blockchain account, the user 905 can begin the process to access their wallet admin 935 to make a transaction on the AXEL blockchain. The user 905 now sends a request 927 to the unified device info 925 to access their wallet admin 935 in order to facilitate the transaction. The unified device info 925 (provided by the PINApp) returns the wallet admin 935 location ID information 929, indicating the device (not shown) that the wallet admin 935 resides on. It is important to note that since the PINApp unifies all user devices (smartphones, tablets, external hard drives, laptop pc's, etc.) that the wallet may reside on a device other than the device hosting the AXEL gateway software.

With continued reference to FIG. 9, the unified device info 925 function has returned the location ID 929 to the user 905, enabling the user 905 to now take the steps necessary to access their digital wallet admin 935. The user 905 sends a request 931 to the AXEL DCA security 930 to access the digital wallet admin 935. The AXEL DCA security 930 responds 933 to the user 905 initiating a secondary connection session (as additional security is required to access the wallet admin 935 administrative functions), a primary connection, requesting authentication via a multifactor code and requesting the user 905 re-enter a proprietary PIN code to ensure user authentication. The user 905 will return 936 the PIN code along with the requested multifactor authentication sequence to the AXEL DCA security 930 to authorize secondary secured access to the user 905 account, including access to the wallet admin 935 administration functions. Once authenticated, the AXEL DCA security 930 will return an acknowledgement 937 establishing a secondary secure connection session allowing the user 905 access to the wallet admin 935 administration functions.

Now that the user 905 has access to the wallet admin 935 administration functions, the user 905 can request 941 a transaction. The wallet admin 935 reviews the contents of the wallet to determine if the wallet contains the (a) type and (b) amount of currency required to facilitate the subject transaction. If the wallet admin 935 determines that the wallet contains both the type and amount of the currency required for the subject transaction, the wallet administration 935 will return 943 an acknowledgement to the user 905, enabling the subject transaction to process.

If the wallet administration 935 determines that the wallet does not meet both of the required criteria (the amount and type of currency required to facilitate the transaction) the wallet administration 935 will engage 946 the financial administration 940 function that provides interaction with external banking and financial resources and governs the preset minimums and maximums that the user 905 has provisioned for their wallet administration 935 to govern financial transactions.

The financial administration 940 will notify 949 the secure API portal 945 of the AXEL blockchain that an external function is required. The secure API portal 945 will notify 951 the secure financial API portal 950 associated with the financial or banking institution 955 of the pending transaction 953. The secure financial API portal 950 will authenticate the user 905 info received 951 from the AXEL blockchain secure API portal 945 based on the criteria 957 determined by the financial or banking institution 955.

Once the authentication of the user 905 has been completed through the secure financial API portal 950 of the financial or banking institution 955, the wallet administration 935 and the financial administration 940 can authorize and send/receive funds based on the criteria set by the user 905.

For the purpose of this example, it is assumed that the user 905 has authorized their financial or banking institution 955 to release funds (in the associated currency type required for the user 905, the blockchain, and the geographic area where appropriate). The secure financial API portal 950 will notify 953 the financial or banking institution 955 of the authorized transaction request. The financial or banking institution 955 (assuming the funds in quantity and type are available) will reply 957 to the secure financial API portal 950 that the requested funds (quantity and type) are available for the subject transaction(s) and have been authorized. The secure financial API portal 950 will reply 959 to the AXEL blockchain secure API portal 945. The AXEL blockchain secure API portal 945 will notify 961 the financial administration 940 of the authorization of the transaction. In turn, the financial administration 940 will notify 963 the wallet administration 935 that the transaction has been authorized. The wallet administration 935 will then release the funds (not shown) to facilitate the transaction and notify 966 the user 905 that the subject transaction has been completed.

As previously discussed, the AXEL chain communications 960 and the AXEL database 965 record the communication between the user 905 and the subject modules discussed above to ensure that a permanent record of all transactions are available for the user 905.

While the discussion with reference to FIG. 9 engages a single external financial or banking source, the AXEL Pay function can engage all financial resources required by the user 905 to facilitate any and all transaction requirements. If the user 905 discussed in FIG. 9 were to need a cryptocurrency such as AXEL tokens to facilitate the subject transaction, the financial or banking institution 955 could be a currency exchange or cryptocurrency marketplace wherein the user 905 could pay (in USD or other) and receive the required AXEL tokens. Based on the current trends in the banking and financial industries, it is contemplated that a bank or other registered financial provider will be able to facilitate any transaction of any type and kind (including cryptocurrency transactions) as regulators continue to expand laws to allow for the use of alternative and crypto-type or digital currencies.

It is important to note (with respect to FIG. 9) that the user 905 can configure the wallet admin 935 and the financial admin 940 to facilitate any request automatically and without need for intervention by the user 905. The functional criteria for the wallet 935 and the financial 940 administrations can be preconfigured by the user 905 to set limits (both min and max) of transactions and balance inquires that do not require human intervention. This capability is intended to allow the user experience to be uninterrupted by authorization requests for the transfer of funds and cryptocurrencies to facilitate their transaction requirements.

While the AXEL Pay discussion above with reference to FIG. 9 was in reference to the use of AXEL Pay on the AXEL blockchain, the functional elements of the AXEL Pay method can be applied to other networking elements of both blockchain and non-blockchain designs that operate and/or may be deployed in both centralized and decentralized networking configurations. Like most functional elements of the AXEL blockchain (such as the PINApp and the DCA), the AXEL Pay mechanism can be integrated into other systems.

The AXEL Pay function allows the management of crypto-type currencies, utility tokens, fiat and other monetary/utility-type payment vehicles. AXEL Pay additionally provides for the use and provisioning/management of both user-owned and controlled wallets and other secondary online/offline fiat and/or token storage repositories, as well as the engagement of external third party banking and other financial resources as discussed above with reference to FIG. 9.

As previously discussed, the wallet and token management (via AXEL Pay) works in conjunction with the financial administration and secure API functions to engage external third party financial institutions such as banks and token marketplaces. Internally, the wallet and token administration control the management of both fiat currency and tokens (or cryptocurrencies).

In one embodiment, the wallet and token management allows a party to manage the engagement of (a) an external banking or financial institution such as a token marketplace or a brokerage account; (b) a local wallet on a user owned device; (c) one or more secondary wallets such as an online/offline vault and/or hardware wallet(s); or, (d) any combination thereof.

In one embodiment, the local user wallet and all secondary token/fiat repositories are managed through the AXEL blockchain wallet and token administration function. While it is not necessary, and for security reasons, may not be advisable that all wallets (primary, secondary, vault or other) be located on the same device, AXEL Pay does not preclude such. The primary and secondary wallet management will now be discussed with reference to FIG. 10. Please note that FIG. 10 assumes that the subject user has already logged into the AXEL Pay function and has complete control over all aspects involving the wallet and token administration functions.

Figure 10:
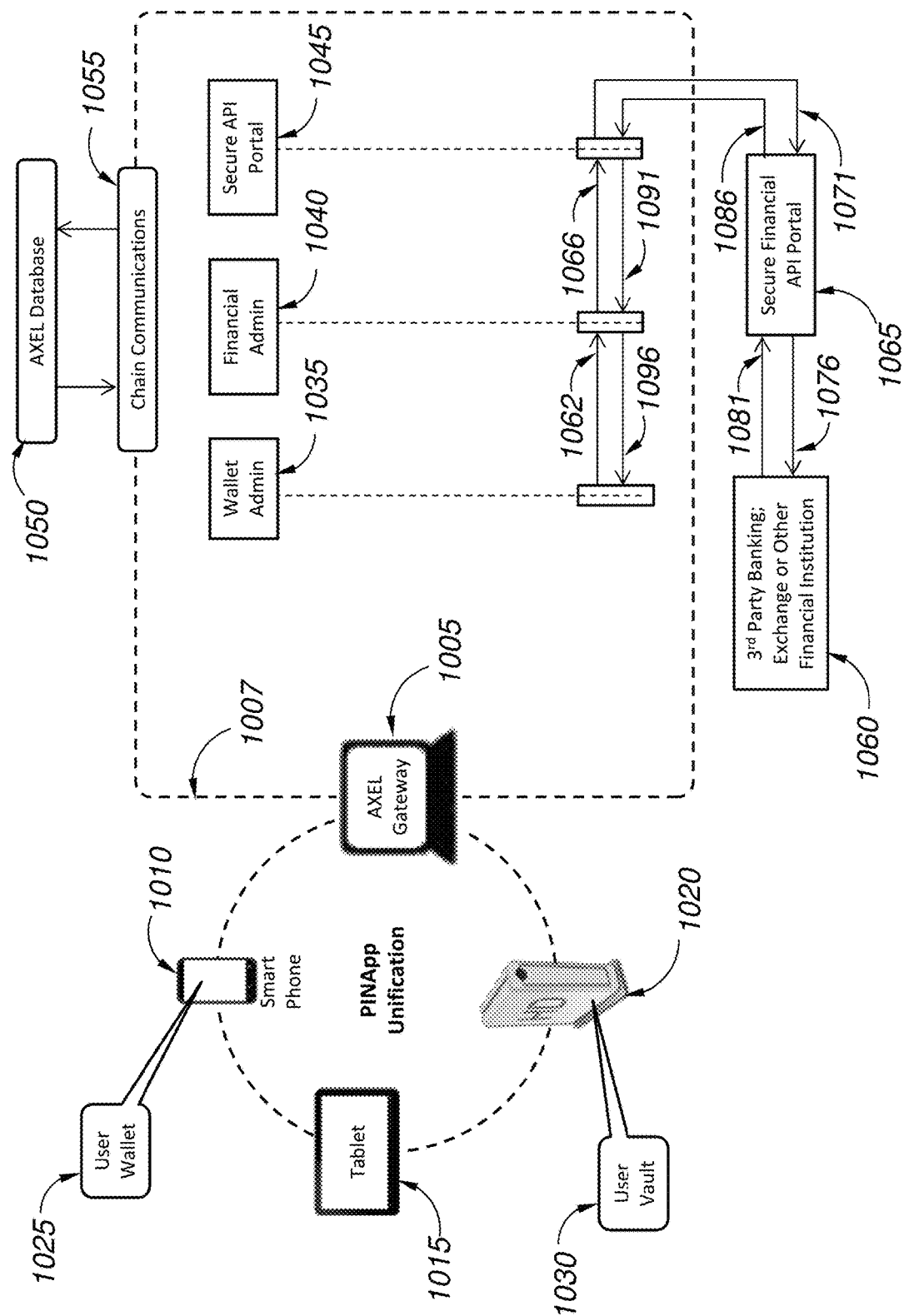
FIG. 10 is a diagram illustrating the wallet management functions within AXEL Pay.

With reference to FIG. 10, the AXEL blockchain 1007 is running on a user personal computer 1005. The personal computer 1005 is running the PINApp unification client that is providing a direct communication link (as well as storage unification) between the user smartphone 1010, the user tablet 1015, the user external hard drive 1020 and the user personal computer 1005. In this example, the user wallet 1025 (managed by the wallet admin 1035) is located on the user smart phone 1025. The user vault 1030 (secondary token/fiat storage) resides on the user external hard drive 1020.

The wallet admin 1035 allows a user to provision the user wallet 1025 and the user vault 1030 with minimum and maximum parameters concerning the amount of tokens, fiat currency or both that is carried and managed by the reference resource. In one embodiment, a user may set the wallet 1025 to a $10 USD minimum on fiat currency. Should the wallet 1025 drop below the $10 USD minimum, the wallet admin 1035 may query the user vault 1030 seeking the funds necessary to bring the user wallet 1025 back to the minimum requirement. If the funds exist in the user vault 1030, they will automatically be transferred to the user wallet 1025 and the user (not pictured) will receive a notification that the AXEL Pay system has moved the associated funds.

In a similar manner as above, the wallet admin may find that the user vault 1030 does not contain the funds required to satisfy the user wallet 1025 minimum and therefore query the third party banking 1060 or other provider institution as chosen by the user. The wallet admin allows the provisioning of the user wallet 1025 and the 1030 to ensure that minimum and maximum funds in either tokens, fiat or both is managed to the user specifications. The wallet admin 1035 may also be provisioned to manage any and all transfer activity into and out of third party institutions (such as the banking 1060 institution).

Should the wallet 1025, the user vault 1030 or the user third party banking institution 1060 become unavailable, the wallet admin will default to the next available repository and notify the user of the unavailability of the resource that cannot be contacted.

As with all functional aspects presented in this submission, all transactions that occur on the AXEL blockchain can be managed via the chain communications 1055. All transactions can be stored and managed by the AXEL database 1050.

While FIG. 10 illustrates the user's personal elements unified through the PINApp technology, one skilled in the art would contemplate utilizing other connectivity mechanisms that allow a user's elements to communicate with each other, such as Bluetooth, Wi-Fi, FTP type connections, IP based connectivity and the like. The AXEL blockchain provides a unique token identification system and method that allows the blockchain to assign a unique identifier to a token or a fractional component thereof. In one embodiment, the AXEL blockchain may generate a token through a process of mining. As the token is mined (generated by the blockchain as a potential reward to a node for resolving a contract) it may be assigned a unique identifier that allows the blockchain to identify the token in the presence of other tokens of the same or different denomination(s).

A token identification system facilitates the ability to track and provide security for both native (tokens generated on the host blockchain, in this case, the AXEL blockchain) and tokens that are introduced to the AXEL blockchain from an external source. In one embodiment, a token such as Bitcoin may be introduced into the AXEL blockchain network. Upon initial introduction, the AXEL token identification system will assign the Bitcoin a unique identifier for the purpose of tracking the movement of the token through the AXEL blockchain. While native tokens within the AXEL blockchain network (AXEL tokens) can be provided a unique identifier as part of the original token generation and subsequently become a part of the token contract (the digital contract that is utilized to generate the tokens on their native blockchain, in this case the AXEL blockchain) itself, non-native tokens (such as Bitcoin) can be assigned an immutable identifier that does not modify the token contract in any way. A designer may also elect to assign an identifier to native tokens in this manner. Please note that the token contract may vary between blockchains, depending on the nature and usage of the token being generated by the contract and the subsequent needs of the blockchain. In the case of the AXEL token which is native to the AXEL blockchain, the tokens are generated at the genesis of the blockchain and will be created and subsequently governed by the criteria detailed by the subject token contract. In other instances, for example where a blockchain already exists and it is desirable to add additional tracking or security, an identifier can be added to native and non-native tokens even after the genesis of the blockchain.

In this example, the token identification system and method provides a non-intrusive method to track the use and movement of tokens throughout the AXEL blockchain network, secure the AXEL blockchain network and tokens thereof, or both. In one embodiment, a user may report that their wallet (user-owned token repository) was breached and tokens were removed and/or stolen. The token identification system may identify information that will assist with tracking those tokens that were removed and/or stolen. Examples of such information include the time, date, and address of the user wallet that each token was removed from, the path through the network they traveled, the repository they were moved to, and where they now reside (if the repository/wallet now hosting the subject stolen tokens resides on the AXEL blockchain network). The token identification system, working in conjunction with the AXEL A.I., the AXEL database, and the chain communications, may then choose to make those tokens invalid for use on the AXEL blockchain, rendering them useless as a currency on the network. Even if tokens are not able to be presently located, making the tokens invalid for use on the AXEL blockchain could potentially render the tokens unusable on the network whenever they return to it. If the tokens later become legitimate once again, for example, upon return or recovery of the tokens, they may again be activated by the AXEL blockchain and eligible for use. This function is uniquely designed to enable transactions between parties (such as a business-to-business environment) wherein managing the movement of funds is mandatory for authenticating valid transactions, as well as providing a layer of security for the subject transactions.

In instances wherein the token identification system and method is present during the generation of the native tokens (as is the case with AXEL tokens on the AXEL blockchain), the token identification system and method can prevent the duplication of these native tokens, as well as the use of similar tokens introduced to the network that did not contain a valid immutable identifier assigned by the token identification system. In one preferred embodiment, the token identification system and method would identify and subsequently deny the use of the AXEL tokens generated outside of the AXEL blockchain network (i.e. forged AXEL tokens). In a similar fashion, the token identification system and method would prevent the generation of, or introduction of, AXEL tokens with identical immutable identifiers. It is noted that tokens may be secured, such as by invalidation as described above, in response to duplication, double spending, unauthorized access/use, or other security events.

It is important to note that the token identification system and method, like many of the functional elements of the AXEL blockchain, may be incorporated on a third party blockchain or other networking configuration. In such cases, the functional elements of the token identification system described herein would perform in a similar manner. In cases wherein the token identification system and method is introduced into a blockchain where the native tokens are already created, the token identification system would provision for immutable identification of the existing tokens as well as provide for identification of tokens that are subdivided or otherwise partitioned, making multiple tokens from a single source token. As an example, if a native token has a value of 5 cents USD and is broken into 5 one-cent tokens, each of these tokens would be provisioned with an immutable identification by the token identification system and method.

The token identification system and method prevents duplication of a token on a blockchain network. In one embodiment, an AXEL token is generated by the network and is created with a unique immutable identifier. For example, should a second AXEL token be introduced to the network or otherwise appear either (a) without an identifier of any kind (b) containing a duplicate identifier (c) containing an identifier that is unauthorized by the network, or (d) any combination thereof, the newly introduced token would be invalidated.

The purpose of the token identification system is to enable the AXEL blockchain to account for, to track, to identify, and to protect all of the cryptocurrencies and/or tokens that are moving through the blockchain. In one preferred embodiment, a user wallet may be compromised or otherwise accessed by an unauthorized user. The wallet owner may report this wallet breach as a security event and the tokens (via the unique identification method) can be tracked to determine where they were moved to on the blockchain and what was done with them. Alternatively or in addition, suspicious activity with regard to a wallet may be detected by AXEL DCA security, an A.I. (artificial intelligence) system, or the like.

In another embodiment using the same example (an unauthorized wallet breach) the tokens that were stolen may be disabled on the AXEL blockchain, rendering them useless. For tokens removed from the AXEL blockchain and taken to an external sales outlet such as a token exchange or other marketplace, the unique token identification can be shared with third party markets to ensure that if stolen tokens appear for sale they can be identified immediately and subsequently blocked from public exchange or sale or may otherwise be rendered ineligible for exchange or sale by the token marketplace (depending on how the third party market chooses to deal with stolen tokens).

In applications such as business-to-business financial transactions, the token identification system may provide an added level of security for the subject transactions. All parties may be made aware that the tokens are identified and unique, and therefore harder to manipulate for fraudulent purposes.

One preferred embodiment of the token identification system will now be discussed with reference to FIG. 11. Please note that the tokens generated on the AXEL blockchain will have an immutable identifier assigned to them during token generation. The following discussion assumes the tokens on the AXEL blockchain network are already generated and assigned these identifiers. For the purpose of understanding the uniqueness of the token identification system and method, FIG. 11 will focus on the tracking of the unique identities as opposed to the physical creation of such. Please note that the public and private chain and their associated layers contain a variety of functional elements that would be apparent to one skilled in the art that are not discussed in this reference. They have been purposefully omitted to limit the explanation provided in FIG. 11 to ensure that the focus is on the functional elements of the token identification system and method.

Figure 11:
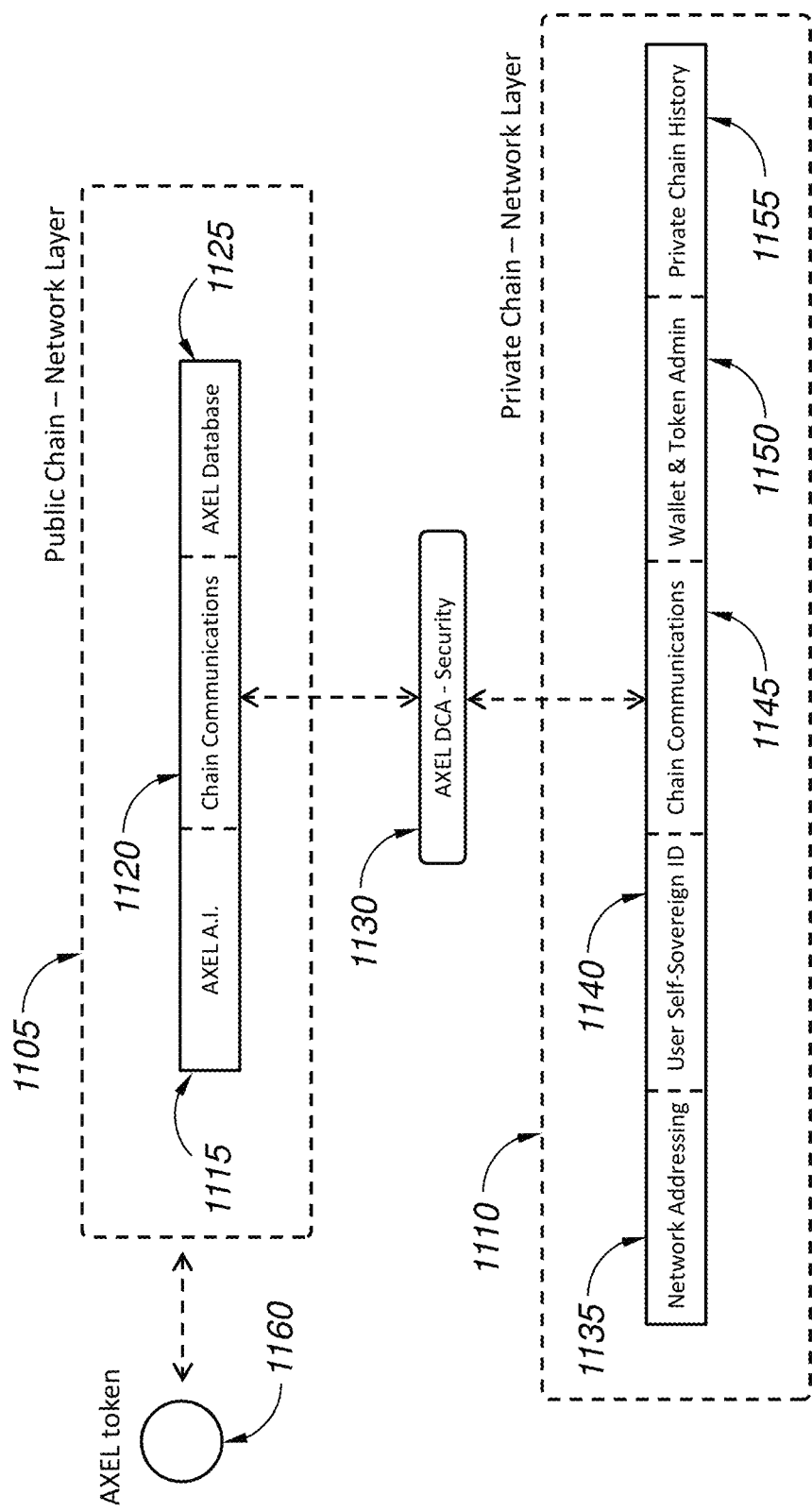
FIG. 11 is a diagram illustrating the functional elements of the Token ID system and method.

With reference to FIG. 11, the following functional elements are engaged in the token identification system. On the network layer of the public chain 1105, the token identification utilizes the AXEL A.I. 1115 for the purpose of monitoring token movement and predicting future movement based on historical trends. Working in conjunction with the AXEL database 1125, the AXEL A.I. 1115 interfaces with the public chain communications 1120 function to capture token movement information on and between both the public chain (via the network layer 1105) and the individual private chains (via the private chain network layer 1110). The AXEL A.I. 1115 tracks the token identification information as tokens are passed on the AXEL blockchain and records this information (through the public chain network layer 1105) to the AXEL database 1125.

The components of the token identification system on the private chain network layer 1110 are the network addressing 1135 function, the user self-sovereign ID 1140, the private chain communications 1145, the wallet and token administration 1150, and the private chain history 1155 functions. These functional elements work together to track the token movements on the private chain.

A monitoring system, the AXEL DCA security 1130, monitors the token movement both on the public chain network layer 1105, the private chain network layer 1110 and the movements of the tokens between these chains that is managed by the chain communications 1120 and 1145 respectively. While all of the functional elements of the AXEL blockchain have been detailed previously in this submission, some may be expanded on in the following example to provide clarity to the aspects each functional element provides in relation to the token identification system within AXEL.

As an example of the functional implementation of token identification system (and with continued reference to FIG. 11), an AXEL token 1160 may be utilized in a transaction. As the AXEL token 1160 moves through the public chain network layer 1105 it is monitored by the public chain communications 11020 and the AXEL A.I. 1115. These modules work together with the AXEL database 1125 to monitor the AXEL token 1160 movement and record the location and movement information in the AXEL database 1125.

As previously stated, the AXEL blockchain has both a public chain and a private chain component. The token identification system and method also tracks and records the token movement on the private chain. As an AXEL token 1160 is moved to the private chain (via the public chain communications 1120, through the AXEL DCA security 1130 and into the private chain communications 1145), it is picked up by the wallet and token administration module 1150 enabling the AXEL token 1160 to appear in the user wallet (not pictured). As the AXEL token 1160 enters the private chain network layer 1110, it is recorded to the private chain history 1155. The private chain history 1155 records all token movement on the private chain held by each individual user.

The user self-sovereign ID 1140 is used by the AXEL blockchain to identify the user to ensure the tokens moving through the AXEL blockchain arrives at the appropriate destination. The record of a token being sent and/or received is tied to both the user self-sovereign ID 1140, the network addressing 1135 of the user and the wallet & token administration 1150. It is important to note that these functional modules work in conjunction with the AXEL DCA security 1130 to positively identify the user, ensuring that any access to the above modules (user self-sovereign ID 1140, wallet and token administration 1150, and private chain history 1155) are associated with the proper user.

In a similar fashion to the movement of an AXEL token 1160 from the public chain network layer 1105 to the private chain network layer 1110 and ultimately to the user wallet (via the wallet and token admin 1150), the transfer of tokens in the reverse direction take a similar path. As an example (with continued reference to FIG. 11) we assume that the AXEL token 1160 is currently residing in a user wallet (not pictured) being managed by the wallet and token administration 1150. As the AXEL token 1160 leaves the wallet (not pictured), the wallet and token administration 1150 reports the activity along with the token identification to the private chain history 1155. The network addressing 1135 will designate the address to which the subject AXEL token 1160 is both originating and will arrive at, while the user self-sovereign ID 1140 will report the user (not pictured) who initiated the token transfer. This information collectively (the network addressing 1135, the user self-sovereign ID 1140, the wallet and token admin 1150) is reported to the private chain history 1155 creating a permanent record of the AXEL token 1160 movement. The private chain communications 1145 will carry the AXEL token 1160 movement information as it leaves the private chain network layer 1110 and again passes through the AXEL DCA security 1130. Once the AXEL token 1160 arrives at the public chain network layer 1105, the public chain communications 1120 will route the AXEL token 1160 to the appropriate party via the AXEL database 1125 and the AXEL A.I. 1115 function.

Among other things, the token identification system and method detects and prevents security events that are common in blockchain, and which create doubt as to the authenticity of tokens, such as "double spending". A double spending occurrence happens when a token is utilized in a transaction and the subject transaction is processed twice. The token identification system and method prevents this as the AXEL blockchain (in conjunction with the token identification system and method) does not allow a token that is currently in-use (being managed through a transaction) to participate in any additional transactions until such a time as the first transaction has been resolved and recorded to a block.

It is important to note that while the embodiments detailed herein, including the token identification system and method, are described as working in a multi-chain environment, all functional elements of the AXEL blockchain may be incorporated into any networking environment wherein digital or electronic transmissions occur.

What is claimed is:

1. A token identification system for securing a plurality of blockchain tokens within a blockchain network, each of the blockchain tokens having a unique identifier associated therewith, the token identification system comprising:
    one or more processors in communication with a public chain network layer and a private chain network layer of the blockchain network, wherein the one or more processors monitor movement and location of the plurality of blockchain tokens between a public chain and a private chain of the blockchain network, wherein at least one of the plurality of blockchain tokens has not moved while associated with the unique identifier thereof;
    one or more storage devices that store the movement and location of the plurality of blockchain tokens within the public chain;
    a private chain history that stores the movement and location of the plurality of blockchain tokens within the private chain; and
    one or more communication devices, wherein, upon a security event, one or more of the plurality of blockchain tokens associated with the security event are invalidated by the one or more processors and their location is reported to the blockchain network via the one or more communication devices;
    wherein the security event comprises:
        detection of a blockchain token having a unique identifier identical to the unique identifier of one or more of the plurality of blockchain tokens;
        receipt of a notification that one or more of the plurality of blockchain tokens or a wallet storing the same have been accessed by an unauthorized user; or
        detection of double spending of one or more of the plurality of blockchain tokens.

2. The token identification system of claim 1, wherein the one or more storage devices, the private chain history, or both store the movement and location of an external blockchain token from an external blockchain network, and the external blockchain token is assigned a unique identifier.

3. The token identification system of claim 1, wherein the security event is detected by an artificially intelligent system.

4. The token identification system of claim 1, wherein the movement and location of the plurality of blockchain tokens is monitored using origin address and destination address and a user identifier that identifies the user that initiated the movement.

5. A computer-implemented method of token identification for securing a plurality of blockchain tokens within a blockchain network, each of the blockchain tokens having a unique identifier associated therewith, the method comprising:
    communicating with the blockchain network via a monitoring system, wherein the monitoring system monitors movement and location of the plurality of blockchain tokens within the blockchain network, wherein at least one of the plurality of blockchain tokens has not moved while associated with the unique identifier thereof;

storing the movement and location of the plurality of blockchain tokens at one or more data storage devices; and detecting a security event, and upon detection of the security event, invalidating and reporting the location of one or more of the plurality of blockchain tokens associated with the security event;

wherein the detecting the security event comprises:
- detection of a blockchain token having a unique identifier identical to the unique identifier of one or more of the plurality of blockchain tokens;
- receipt of a notification that one or more of the plurality of blockchain tokens or a wallet storing the same have been accessed by an unauthorized user; or
- detection of double spending of one or more of the plurality of blockchain tokens.

6. The computer-implemented method of claim 5, wherein the database, the private chain history, or both stores the movement and location of an external blockchain token from an external blockchain network, and the external blockchain token is assigned a unique identifier.

7. The computer-implemented method of claim 5, wherein detection of the security event is detected by an artificially intelligent system.

8. The computer-implemented method of claim 5, wherein the movement and location of the plurality of blockchain tokens is monitored using origin address and destination address and a user identifier that identifies the user that initiated the movement.

9. A computer-implemented method of token identification for securing a plurality of blockchain tokens within a blockchain network, the method comprising:

communicating with a public chain network layer and a private chain network layer of the blockchain network via a monitoring system, wherein the monitoring system monitors movement and location of the plurality of blockchain tokens between a public chain and a private chain of the blockchain network;

assigning a unique identifier to the plurality of blockchain tokens and to one or more external blockchain tokens, wherein the one or more external blockchain tokens are received from an external blockchain network, wherein at least one of the plurality of blockchain tokens has not moved while associated with the unique identifier thereof;

storing the movement and location of the plurality of blockchain tokens within the public chain in a database; and storing the movement and location of the plurality of blockchain tokens within the private chain in a private chain;

detecting a security event, and upon detection of the security event, invalidating and reporting the location of one or more of the plurality of blockchain tokens associated with the security event;

wherein the security event comprises:
- detection of a blockchain token having a unique identifier identical to the unique identifier of one or more of the plurality of blockchain tokens;
- receipt of a notification that one or more of the plurality of blockchain tokens or a wallet storing the same have been accessed by an unauthorized user
- detection of double spending of one or more of the plurality of blockchain tokens.

10. The computer-implemented method of claim 9, wherein the database, the private chain, or both store the movement and location of an external blockchain token from an external blockchain network, and the external blockchain token is assigned a unique identifier.

11. The computer-implemented method of claim 9, wherein the movement and location of the plurality of blockchain tokens is monitored using origin address and destination address and a user identifier that identifies the user that initiated the movement.

* * * * *